(12) United States Patent
Li et al.

(10) Patent No.: US 10,346,214 B2
(45) Date of Patent: Jul. 9, 2019

(54) SYSTEMS AND METHODS FOR REDUCING CPU TIME TO COMPUTE STATE SPACE OF RESOURCE ALLOCATION SYSTEM

(71) Applicant: Macau University of Science and Technology, Macau (CN)

(72) Inventors: Zhiwu Li, Macau (CN); Oussama Karoui, Macau (CN); Naiqi Wu, Macau (CN); Mohamed Khalgui, Macau (CN)

(73) Assignee: Macau University of Science and Technology, Macau (CN)

( * ) Notice: Subject to any disclaimer, the term of this patent is extended or adjusted under 35 U.S.C. 154(b) by 168 days.

(21) Appl. No.: 15/649,634

(22) Filed: Jul. 13, 2017

(65) Prior Publication Data

US 2019/0018708 A1 Jan. 17, 2019

(51) Int. Cl.
*G06F 9/46* (2006.01)
*G06F 9/50* (2006.01)
*G06F 9/48* (2006.01)

(52) U.S. Cl.
CPC .......... *G06F 9/5038* (2013.01); *G06F 9/4887* (2013.01)

(58) Field of Classification Search
CPC .............................. G06F 9/5038; G06F 9/4887
USPC .......................................................... 718/104
See application file for complete search history.

(56) References Cited

U.S. PATENT DOCUMENTS

2006/0015313 A1* 1/2006 Wang .................. G06F 17/5027
703/14

2016/0085530 A1* 3/2016 Duran Gonzalez ..... G06F 8/452
717/105

OTHER PUBLICATIONS

S. A. Reveliotis and E. Roszkowska, "Conflict resolution in free-ranging multivehicle systems: A resource allocation paradigm," IEEE Trans. Robot., vol. 27, No. 2, pp. 283-296, 2011.
P. Lawrence, The first chapter of "Workflow Handbook," John Wiley & Sons, New York, 1997.
Chen, Y. F., Li, Z. W., Barkaoui, K, and Uzam, M., "New Petri net structure and its application to optimal supervisory control: Interval inhibitor arcs," IEEE Trans. Syst., Man, Cybern., Syst., vol. 44, No. 10, pp. 1384-1400, 2014.
Y. Chen and Z. Li, "Design of a maximally permissive liveness-enforcing supervisor with a compressed supervisory structure for flexible manufacturing systems," Automatica, vol. 47, No. 5, pp. 1028-1034, 2011.

(Continued)

*Primary Examiner* — Camquy Truong
(74) *Attorney, Agent, or Firm* — Eagle IP Limited; Jacqueline C. Lui

(57) ABSTRACT

Given a sequential resource allocation system (RAS) topology structure, a state space, called an impulse state space, corresponding to the impulse response of a linear time-invariant system (LTS), is computed by small enough configuration of the considered RAS. Given an initial resource configuration of a RAS which corresponds to an input of an LTS, a complete state enumeration can be obtained by defining the convolution of this configuration with the pre-computed impulse state space. One example embodiment reduces central processing unit (CPU) time to process instructions that compute a target state space of a RAS includes constructing an initial RAS and an initial state space, and extending the initial state space iteratively under a target resource configuration.

20 Claims, 20 Drawing Sheets

(56) References Cited

OTHER PUBLICATIONS

Y. Chen, Z. Li, M. Khalgui, and O. Mosbahi, "Design of a maximally permissive liveness-enforcing Petri net supervisor for flexible manufacturing systems," IEEE Trans. Autom. Sci. Eng., vol. 8, No. 2, pp. 374-393, 2011.
A. Nazeem, S. Reveliotis, Y. Wang, and S. Lafortune, "Designing compact and maximally permissive deadlock avoidance policies for complex resource allocation systems through classification theory: The linear case," IEEE Trans. Autom. Control, vol. 56, No. 8, pp. 1818-1833, 2011.
P. J. Ramadge and W. M. Wonham, "The control of discrete event systems," Proc. IEEE, vol. 77, No. 1, pp. 81-98, 1989.
T. Murata, "Petri nets: Properties, analysis and applications," Proc. IEEE, vol. 77, No. 4, pp. 541-580, Apr. 1989.
Z. Li and M. Zhao, "On controllability of dependent siphons for deadlock prevention in generalized Petri nets," IEEE Trans. Syst., Man, Cybern. A, vol. 38, No. 2, pp. 369-384, 2008.
L. Feng and W. M. Wonham, "TCT: A computation tool for supervisory control synthesis," in Proc. of the 8th Int. Workshop on Discrete Event Syst., Ann Arbor, MI, pp. 388-389, 2006.
J. Ezpeleta, J. M. Colom, and J. Martinez, "A Petri net based deadlock prevention policy for flexible manufacturing systems," IEEE Trans. Robot. Autom., vol. 11, No. 2, pp. 173-184, 1995.
R. A. Wysk, N.-S. Yang, and S. Joshi, "Resolution of deadlocks in flexible manufacturing systems: avoidance and recovery approaches," Journal of Manufacturing Syst., vol. 13, No. 2, pp. 128-138, 1994.
T. K. Kumaran, W. Chang, H. Cho, and R. A. Wysk, "A structured approach to deadlock detection, avoidance and resolution in flexible manufacturing systems," Int. Journal of Production Research, vol. 32, No. 10, pp. 2361-2379, 1994.
M. Uzam, Z. Li, G. Gelen, and R. S. Zakariyya, "A divide-and-conquer-method for the synthesis of liveness enforcing supervisors for flexible manufacturing systems," Journal of Intelligent Manufacturing, vol. 27, No. 5, pp. 1111-1129, Oct. 2016.
N. Wu, M. Zhou, and Z. Li, "Resource-oriented Petri net for deadlock avoidance in flexible assembly systems," IEEE Trans. Syst., Man, Cybern. A, vol. 38, No. 1, pp. 56-69, 2008.
Y. Chen, Z. Li, K. Barkaoui, and A. Giua, "On the enforcement of a class of nonlinear constraints on Petri nets," Automatica, vol. 55, pp. 116-124, 2015.
K. Barkaoui and B. Lemaire, "An effective characterization of minimal deadlocks and traps in Petri nets based on graph theory,"in Proc. 10th Int. Conf. Application and Theory of Petri Nets, France, pp. 1-21, 1989.
J. Ezpeleta, J.-M. Couvreur, and M. Silva, "A new technique for finding a generating family of siphons, traps and st-components. Application to colored Petri Nets," in Proc. 12th Int. Conf. on Application and Theory of Petri Nets, Aarhus, Denmark, pp. 126-147, 1991.
R. E. Bryant, "Symbolic Boolean manipulation with ordered binary-decision diagrams," ACM Computing Surveys (CSUR), vol. 24, No. 3, pp. 293-318, 1992.
A. Giua, "Supervisory control of a manufacturing system using Petri net structures," in Proc. IEEE Int. Workshop on Emerging Technologies and Factory Automation, France, pp. 105-116, 1995.
K. Varpaaniemi, "On the Stubborn Set Method in Reduced State Space Generation," Ph.D. dissertation, Helsinki University of Technology, Department of Computer Science and Engineering, Digital Systems Laboratory, Espoo, Finland, 1998.
A. Valmari, "On-the-fly verification with stubborn sets," in Proc. 5th Int. Conf. on Computer Aided Verification, Springer-Verlag, London, UK, pp. 397-408, 1993.
S. B. Akers, "Binary decision diagrams," IEEE Trans. Comput., vol. 100, No. 6, pp. 509-516, 1978.
A. S. Miner and G. Ciardo, "Efficient reachability set generation and storage using decision diagrams," in Proc. Int. Conf. on Application and Theory of Petri nets, Berlin Heidelberg, pp. 6-25, 1999.
T. Araki, Y. Sugiyama, T. Kasami, and J. Okui, "Complexity of the deadlock avoidance problem," in Proc. 2nd IBM Symp. on Mathematical Foundations of Computer Science, Japan, pp. 229-257, 1977.
E. M. Gold, "Deadlock prediction: Easy and difficult cases," SIAM Journal on Computing, vol. 7, No. 3, pp. 320-336, 1978.
M. Lawley and S. Reveliotis, "Deadlock avoidance for sequential resource allocation systems: hard and easy cases," Int. Journal of Flexible Manufacturing Syst., vol. 13, No. 4, pp. 385-404, 2001.
A. Nazeem and S. Reveliotis, "A practical approach for maximally permissive liveness-enforcing supervision of complex resource allocation systems," IEEE Trans. Autom. Sci. Eng., vol. 8, No. 4, pp. 766-779, 2011.
K.-Y. Xing, B.-S. Hu, and H.-X. Chen, "Deadlock avoidance policy for Petri-net modeling of flexible manufacturing systems with shared resources," IEEE Trans. Autom. Control, vol. 41, No. 2, pp. 289-295, 1996.
E. Davison, "The robust control of a servomechanism problem for linear time-invariant multivariable systems," IEEE Trans. Autom. Control, vol. 21, No. 1, pp. 25-34, 1976.
Chen, Y., Li, Z., Barkaoui, K, Wu, N., and Zhou, M., "Compact supervisory control of discrete event systems by Petri nets with data inhibitor arcs," IEEE Transactions on Systems, Man, and Cybernetics: Systems, vol. 47, No. 2, pp. 364-379, 2017.
H. Kwakernaak and R. Sivan, The first chapter of "Modern signals and systems," NASA STI/Recon Technical Report A, vol. 91, p. 11586, 1991.
S. Reveliotis, The first chapter of "Real-Time Management of Resource Allocation Systems: A Discrete Event Systems Approach", Springer US, 2006.
X. Wang, Z. Li, and W. M. Wonham, "Dynamic multiple-period reconfiguration of real-time scheduling based on timed DES supervisory control," IEEE Transactions on Industrial Informatics, vol. 12, No. 1, pp. 101-111, 2016.
L.P. Bai, N.Q. Wu, Z.W. Li, M.C. Zhou, "Optimal one-wafer cyclic scheduling and buffer space configuration for single-arm multicluster tools with linear topology," IEEE Transactions on Systems, Man, and Cybernetics: Systems, vol. 46, No. 10, pp. 1456-1467, 2016.
S. Reveliotis and A. Nazeem, "Deadlock Avoidance Policies for Automated Manufacturing Systems Using Finite State Automata," in Formal Methods in Manufacturing, J. Campos, C. Seatzu and X. Xiev ed. CRC Press / Taylor and Francis, pp. 169-195, 2014.
C. G. Cassandras and S. Lafortune, The first chapter of "Introduction to Discrete Event Systems," Springer Science & Business Media, 2009.
R. L. Allen and D. Mills, The first chapter of "Signal Analysis: Time, Frequency, Scale, and Structure", John Wiley & Sons, 2004.
M J. Roberts, The first chapter of "Fundamentals of Signals & Systems," McGraw Hill, New York, 2008.
Tina tool, http://projects.laas.fr/tina//index.php.

* cited by examiner

310

| Based on the Structure of the Process Sequential Logic | Based on the Structure of the Requirement Vectors |
|---|---|
| Linear: Each process is defined by a linear sequence of stages.<br><br>Disjunctive: A number of alternative process plans encoded by an acyclic digraph.<br><br>Merge-Split: Each process is a fork-join network.<br><br>Complex: A combination of the above behaviors. | Single unit: Each stage requires a single from a single resource.<br><br>Single Type: Each stage requires an arbitrary number of units, but all from a single resource.<br><br>Conjunctive: Stages require different resources at arbitrary levels. |

Algorithm 1: Computing the state space $S(\Omega^{(1)}, C^{(1)})$ from an impulse state space $S\langle\Omega, C\rangle$

Input: Impulse state space $S(\Omega, C)$

Output: S ($\Phi^{(1)}$) generated from $S(\Omega, C)$ by increasing the capacity of a resource by one.

$L \leftarrow S(\Omega, C)$; // initialize $L$ with elements of $S(\Omega, C)$.

$\Gamma(R_\alpha) = \{\Pi_i | \Pi_i = \langle \Delta_i, \Upsilon_i \rangle, \Delta_i = \{\Xi_{i1}, \Xi_{i2}, ..., \Xi_{i,l_1}\}, \exists \Xi \in \Delta_i, D(\Xi)[\alpha] \neq 0\}$
// process types in which the execution of some processing stages involve the resource $R_\alpha$ $Q \leftarrow L$;
S ($\Phi^{(1)}$) $\leftarrow S(\Omega, C)$
for ($\Pi$ $in$ $\Gamma(R_\alpha)$) do
    while ($Q! = \emptyset$) do
        $s =$ POP $Q$;
        $s^{(1)} = \begin{cases} s[l] + 1 \; if \; D(\Xi_l[\alpha]) \neq 0 \\ \quad s[l] \; otherwise \end{cases}$
        $\forall l \in \{1, ..., \xi\}$
        S($\Phi^{(1)}$) $\leftarrow \{s^{(1)}\} \cup$ S ($\Phi^{(1)}$)
    end
    $Q \leftarrow L$
end
return S ($\Phi^{(1)}$)

Algorithm 2: Computing the state space for a given RAS $\Phi^{(1)}$
input : State space $S(\Omega, C)$
output: State space $S(\Phi^{(1)})$ with $\Phi^{(1)} = (\Omega^{(1)}, C^{(1)})$, where $C^{(1)} \geq C$
$R^+ = \{R \in R | C^{(1)}(R) \geq C(R)\}$ // Set of resources which have capacities greater than the configuration of the impulse state space
$Q \leftarrow \emptyset$;
While($R$ $in$ $R^+$) do
    While $(C(R) \leq C^{(1)}(R))$ do
        $Q \leftarrow Algorithm1(S(\Omega, C))$
        $S(\Omega, C) \leftarrow Q$
        $C(R) = C(R) + 1$
    end
end
$S(\Phi^{(1)}) \leftarrow S(\Omega, C)$
Return $S(\Phi^{(1)})$

Algorithm 3: Reachability of a given state s in $S(\Phi^{(1)})$
Input   : $\xi$-dimensional vector $s$
Output: Boolean variable: $isReachable$
$isReachable := $ false
Compute $S(\Phi^{(0)})$   // $\Phi^{(0)} = (\Omega^{(0)}, C^{(0)})$ is an initial RAS
$R^+ = \{R \in R | C^{(1)}(R) \geq C(R)\}$  // Set of resources which have capacities greater than the configuration of the impulse state space
$Q \leftarrow \emptyset$
While $(R_\alpha \in R^+)$ do
   $\Gamma(R_\alpha) = \{\Pi_i | \Pi_i = \langle \Delta_i, Y_i \rangle,\ \Delta_i = \{\Xi_{i1}, \Xi_{i2}, ..., \Xi_{i,l_i}\}, \exists \Xi \in \Delta_i, D(\Xi)[\alpha] \neq 0\}$
   // process types in which the execution of some processing stages involves the resource type $R_\alpha$.
   While $(C^{(1)}(R_\alpha) > C^{(0)}(R_\alpha))$ do
      While $(\Pi_i\ in\ \Gamma(R_\alpha))$ do
         $l = 1$
         While $((s[l]\ in\ s)\ \&\&\ (l \leq \xi))$ do
            If $(D(\Xi_l)[\alpha] \neq 0)$ then
               $s[l] = s[l] - 1$
            end
            $l++$
         end
         PUSH $(s, Q)$
      end
      $C^{(1)}(R_\alpha) := C^{(1)}(R_\alpha) - 1$
   end
end
While $(Q \neq \emptyset)$ do
   $s = $ POP $(Q)$
   While $(s_i\ in\ S(\Phi^{(0)})\ \&\&\ (isReachable = false))$ do
      $isReachable = $ compare $(s_i, s)$
   end
end
return $isReachable$

| Process Plans | $J_1 : R_1 \to R_2 \to R_3$ |
|---|---|
| | $J_2 : R_3 \to R_2 \to R_1$ |
| Resource Capacities | $C_1 = C_3 = 1$ |
| | $C_2 = 4$ |

| Process Plans | $J_1 : R_1 \to R_2 \to R_3$ |
|---|---|
| | $J_2 : R_3 \to R_2 \to R_1$ |
| Resource Capacities | $C_1 = C_2 = C_3 = 5$ |

Figure 11

Algorithm 4: Construction of event sequences leading to a given state.
Input : $\xi$-dimensional vector $s$
Output: Reachable subspace from the initial state $s_0$ to $s$
Construct the two nodes $s_0$ and $s$
PUSH $(s, Q)$
While $(Q \neq \emptyset)$ do
    $s = $ POP $(Q)$
    While $(s \neq s_0)$ do
        While $(\Delta_j \in s)$ do
            If $(s'[l] \in Q_j^{\nearrow})$ then
                $s'[l] = s[l] - 1$
            end
            else
                $s'[l] = s[l]$
            end
        end
        if $(\forall i = 1, \ldots, m, \sum_{l=1}^{\xi} s'[l].D(\Xi_l[i]) \leq C_i))$ then
            Construct the node $s'$
            PUSH $(s, Q)$
        end
        while $(\Delta_j \in s)$ do
            If $(s'[l] \in Q_j^{\searrow})$ then
                $s'[l] = s[l] + 1$
            end
            else
                $s'[l] = s[l]$
            end
        end
        if $(\forall i = 1, \ldots, m, \sum_{l=1}^{\xi} s'[l].D(\Xi_l[i]) \leq C_i))$ then
            Construct the node $s'$
            PUSH $(s, Q)$
        End
        while $(\Delta_j \in s)$ do
            $s' = s$
            While $((s[l] \in \Delta_j)\ \&\&\ (s[l+1] \in \Delta_j))$ do
                $s'[l] = s[l] + 1$
                If $(s[l] + 1 \neq 0)$ then
                    $s'[l+1] := s[l+1] - 1$
                end
                if $(\forall i = 1, \ldots, m, \sum_{l=1}^{\xi} s'[l].D(\Xi_l[i]) \leq C_i))$ then
                  Construct the node $s'$
                  PUSH $(s, Q)$
            end
        end
    end
end

☐ A new process instance is loaded
☐ Advancing from a stage to the next stage
☐ A finished process instance is unloaded

1400

| Process Plans | $J_1 : R_1 \to R_2 \to R_5 \to R_6 \to R_3 \to R_4 \to R_5 \to R_6$ $J_2 : R_3 \to R_4 \to R_1 \to R_2 \to R_8 \to R_7$ |
|---|---|
| Resource Capacities | $C_1 = 2, C_2 = C_3 = C_4 = C_5 = C_6 = C_7 = C_8 = 1$ |
| Initial Resource Configuration | $C_1 = C_2 = C_3 = C_4 = C_5 = C_6 = C_7 = C_8 = 1$ |

Figure 14

| Conf | Additional Unit | Capacities $\{C_1, C_2, C_3\}$ | $|S(\Phi)|$ |
|---|---|---|---|
| 1 | R2 | (1, 2, 1) | 47 |
| 2 | R3 | (1, 2, 2) | 98 |
| 3 | R1 | (2, 2, 2) | 203 |
| 4 | R1 | (3, 2, 2) | 343 |
| 5 | R2 | (3, 3, 2) | 581 |
| 6 | R3 | (3, 3, 3) | 978 |
| 7 | R3 | (3, 3, 4) | 1473 |
| 8 | R2 | (3, 4, 4) | 2222 |
| 9 | R1 | (4, 4, 4) | 3342 |
| 10 | R2 | (4, 5, 4) | 4691 |
| 11 | R1 | (5, 5, 4) | 6575 |
| 12 | R3 | (5, 5, 5) | 9215 |
| 13 | R2 | (5, 6, 5) | 12301 |
| 14 | R1 | (6, 6, 5) | 16410 |
| 15 | R3 | (6, 6, 6) | 21891 |
| 16 | R1 | (7, 6, 6) | 28155 |
| 17 | R1 | (8, 6, 6) | 35202 |
| 18 | R1 | (9, 6, 6) | 43032 |
| 19 | R1 | (10, 6, 6) | 51645 |

| Process Plans | $J_1 : R_1 \to R_3 \to R_2 \to R_3 \to R_2 \to R_4$ |
| --- | --- |
| | $J_2 : R_4 \to R_3 \to R_2 \to R_1$ |
| Resource Capacities | $C_1 = C_2 = C_3 = 11 = 11$ |
| | $C_4 = 1$ |

| RAS | Definition | State Space Computation |
| --- | --- | --- |
| (a) | Table 1900 | Table 2000 |
| (b) | Table 2100 | Table 2200 |
| (c) | Table 2300 | Table 2400 |

| Conf | Additional Unit | Capacities $\{C_1, C_2, C_3, C_4\}$ | $|S(\Phi)|$ |
|---|---|---|---|
| 1 | - | (1, 1, 1, 1) | 99 |
| 1 | R1 | (2, 1, 1, 1) | 207 |
| 1 | R1 | (3, 1, 1, 1) | 351 |
| 1 | R1 | (4, 1, 1, 1) | 531 |
| 1 | R1 | (5, 1, 1, 1) | 747 |
| 1 | R1 | (6, 1, 1, 1) | 999 |
| 1 | R1 | (7, 1, 1, 1) | 1287 |
| 1 | R1 | (8, 1, 1, 1) | 1611 |
| 1 | R1 | (9, 1, 1, 1) | 1971 |
| 1 | R1 | (10, 1, 1, 1) | 2367 |
| 1 | R1 | (11, 1, 1, 1) | 2799 |
| 1 | R2 | (11, 2, 1, 1) | 7470 |
| 1 | R2 | (11, 4, 1, 1) | 28035 |
| 1 | R2 | (11, 5, 1, 1) | 45801 |
| 1 | R2 | (11, 6, 1, 1) | 69804 |
| 1 | R2 | (11, 7, 1, 1) | 100980 |
| 1 | R2 | (11, 8, 1, 1) | 140265 |
| 1 | R2 | (11, 9, 1, 1) | 188595 |
| 1 | R2 | (11, 10, 1, 1) | 246906 |
| 1 | R2 | (11, 11, 1, 1) | 316134 |
| 1 | R3 | (11, 11, 2, 1) | 820794 |
| 1 | R3 | (11, 11, 3, 1) | 1666080 |
| 1 | R3 | (11, 11, 4, 1) | 2937168 |
| 1 | R3 | (11, 11, 5, 1) | 4719234 |
| 1 | R3 | (11, 11, 6, 1) | 7097454 |
| 1 | R3 | (11, 11, 7, 1) | 10157004 |
| 1 | R3 | (11, 11, 8, 1) | 13983060 |
| 1 | R3 | (11, 11, 9, 1) | 18660798 |
| 1 | R3 | (11, 11, 10, 1) | 24275394 |
| 1 | R3 | (11, 11, 11, 1) | 30912024 |

Figure 18

| | 1900 |
|---|---|
| Process Plans | $J_1 : R_4 \to R_3 \to R_2 \to R_1$<br>$J_2 : R_7 \to R_6 \to R_7$<br>$J_3 : R_1 \to R_5 \to R_7 \to R_6 \to R_4$<br>$J_4 : R_1 \to R_2 \to R_7 \to R_3 \to R_4$ |
| Resource Capacities | $C_1 = 2, C_2 = 6, C_3 = 5, C_4 = 4,$<br>$C_5 = C_6 = 2, C_7 = 3$ |

| Conf | Additional Unit | Capacities $\{C_1, C_2, ..., C_7\}$ | $|S(\Phi)|$ |
|---|---|---|---|
| 1 | - | (1, 2, 1, 1, 1, 1, 1) | 35412 |
| 2 | R1 | (2, 2, 2, 1, 1, 1, 2) | 73494 |
| 3 | R2 | (2, 3, 2, 1, 1, 1, 2) | 124731 |
| 4 | R2 | (2, 4, 2, 1, 1, 1, 2) | 188868 |
| 5 | R2 | (2, 5, 2, 1, 1, 1, 2) | 265905 |
| 6 | R2 | (2, 6, 2, 1, 1, 1, 2) | 355842 |
| 7 | R3 | (2, 6, 3, 1, 1, 1, 2) | 536394 |
| 8 | R3 | (2, 6, 4, 1, 1, 1, 2) | 716946 |
| 9 | R3 | (2, 6, 5, 1, 1, 1, 2) | 897498 |
| 10 | R4 | (2, 6, 5, 2, 1, 1, 2) | 1801956 |
| 11 | R4 | (2, 6, 5, 3, 1, 1, 2) | 3007900 |
| 12 | R4 | (2, 6, 5, 4, 1, 1, 2) | 4515330 |
| 13 | R5 | (2, 6, 5, 4, 2, 1, 2) | 6778560 |
| 14 | R6 | (2, 6, 5, 4, 2, 2, 2) | 13691340 |
| 15 | R7 | (2, 6, 5, 4, 2, 2, 3) | 37287990 |

Figure 20

|  |  |
|---|---|
| Process Plans | J1 : R1 → R2 → R5 → R6 → R3 → R4 → R5 → R6<br>J2 : R3 → R4 → R1 → R2 → R8 → R7 |
| Resource Capacities | C1 = C2 = C3 = C4 = C5 = C6 = 4<br>C7 = 3<br>C8 = 1, |

Figure 21

| Conf | Additional Unit | Capacities $\{C_1, C_2, ..., C_8\}$ | $\|S(\Phi)\|$ |
|---|---|---|---|
| 1 | - | (1, 1, 1, 1, 1, 1, 1, 1) | 2740 |
| 2 | R1 | (2, 1, 1, 1, 1, 1, 1, 1) | 5512 |
| 3 | R1 | (3, 1, 1, 1, 1, 1, 1, 1) | 9208 |
| 4 | R1 | (4, 1, 1, 1, 1, 1, 1, 1) | 13828 |
| 5 | R2 | (4, 2, 1, 1, 1, 1, 1, 1) | 27672 |
| 6 | R2 | (4, 3, 1, 1, 1, 1, 1, 1) | 46136 |
| 7 | R2 | (4, 4, 1, 1, 1, 1, 1, 1) | 69220 |
| 8 | R3 | (4, 4, 2, 1, 1, 1, 1, 1) | 142120 |
| 9 | R3 | (4, 4, 3, 1, 1, 1, 1, 1) | 239320 |
| 10 | R3 | (4, 4, 4, 1, 1, 1, 1, 1) | 360820 |
| 11 | R4 | (4, 4, 4, 2, 1, 1, 1, 1) | 723480 |
| 12 | R4 | (4, 4, 4, 3, 1, 1, 1, 1) | 1207640 |
| 13 | R4 | (4, 4, 4, 4, 1, 1, 1, 1) | 1813300 |
| 14 | R5 | (4, 4, 4, 4, 2, 1, 1, 1) | 3635600 |
| 15 | R5 | (4, 4, 4, 4, 3, 1, 1, 1) | 6065400 |
| 16 | R5 | (4, 4, 4, 4, 4, 1, 1, 1) | 9102700 |
| 17 | R6 | (4, 4, 4, 4, 4, 2, 2, 1) | 18210300 |
| 18 | R6 | (4, 4, 4, 4, 4, 3, 3, 1) | 30355400 |
| 19 | R7 | (4, 4, 4, 4, 4, 4, 3, 2) | 45533100 |

| Process Plans | $J_1 : R_6 \to R_4 \to R_2 \to R_3 \to R_1$ |
| | $J_2 : R_4 \to R_2 \to R_3 \to R_4 \to R_3$ |
| | $J_3 : R_5 \to R_6 \to R_4 \to R_5 \to R_3$ |
| Resource Capacities | $C_1 = C_6 = 2, C_3 = C_4 = C_5 = 3$ |

| Conf | Additional Unit | Capacities $\{C_1, C_2, ..., C_6\}$ | $|S(\Phi)|$ |
|---|---|---|---|
| 1 | - | (1, 1, 1, 1, 1, 1) | 1146 |
| 1 | R1 | (2, 1, 1, 1, 1, 1) | 1719 |
| 1 | R2 | (2, 2, 1, 1, 1, 1) | 3492 |
| 1 | R3 | (2, 2, 2, 1, 1, 1) | 18288 |
| 1 | R3 | (2, 2, 3, 1, 1, 1) | 43386 |
| 1 | R4 | (2, 2, 3, 2, 1, 1) | 136212 |
| 1 | R4 | (2, 2, 3, 3, 1, 1) | 323226 |
| 1 | R5 | (2, 2, 3, 2, 2, 1) | 652734 |
| 1 | R5 | (2, 2, 3, 3, 3, 1) | 1092078 |
| 1 | R6 | (2, 2, 3, 3, 3, 2) | 2189916 |

Figure 24

SYSTEMS AND METHODS FOR REDUCING CPU TIME TO COMPUTE STATE SPACE OF RESOURCE ALLOCATION SYSTEM

FIELD OF THE INVENTION

The present invention relates to methods and apparatus that reduces central processing unit (CPU) time to process instructions that compute a state space of a sequential resource allocation system RAS).

BACKGROUND

Due to computational complexity of a large state space that grows exponentially with respect to the size of an underlying RAS, which is known as the state space explosion, computing a complete state enumeration consumes substantial CPU time and computer resources. It is difficult to implement and deploy a computationally effective maximally permissive liveness-enforcing supervisor for sequential resource allocation systems.

New methods and apparatus that assist in advancing technological needs and industrial applications in computation of a state space of a RAS are desirable.

SUMMARY OF THE INVENTION

One example embodiment is a method executed by a computer system to reduce central processing unit (CPU) time to process instructions that compute a state space of a sequential resource allocation system (RAS) Φ that allocates a set of resources to multiple processes. The method includes constructing an initial RAS by imposing a predefined initial resource configuration to each system resource type; computing an initial state space of the initial RAS; reducing CPU time that process instructions that compute a target state space of the RAS by extending the initial state space iteratively under a target resource configuration. Each iteration creates a subspace and includes imposing an impulse resource configuration in which a capacity of a resource is increased by one unit from a resource configuration of a step; and calculating a convolution of an input signal with an impulse response in a linear time invariant system (LTS) that outputs a larger state space. The resource configuration corresponds to the input signal in the LTS and the impulse resource configuration corresponds to the impulse response in the LTS.

Other example embodiments are discussed herein.

BRIEF DESCRIPTION OF THE DRAWINGS

FIG. 3 shows the RAS taxonomy in accordance with an example embodiment.

FIG. 6 shows a pseudo code that outlines algorithm 1 for computing a state space from an impulse state space in accordance with an example embodiment.

FIG. 7 shows a pseudo code that outlines algorithm 2 for computing a state space for a given RAS in accordance with an example embodiment.

FIG. 9 shows a pseudo code that outlines algorithm 3 for determining the reachability of a given state in a state space in accordance with an example embodiment.

FIG. 10 shows a RAS and its configuration in accordance with an example embodiment.

FIG. 11 shows a RAS and its configuration in accordance with an example embodiment.

FIG. 12 shows a pseudo code that outlines algorithm 4 for constructing event sequences leading to a given state in accordance with an example embodiment.

FIG. 14 shows a RAS and its configuration in accordance with an example embodiment.

FIG. 15 shows a computation result of the state space in accordance with an example embodiment.

FIG. 16 shows a RAS and its configuration in accordance with an example embodiment.

FIG. 17 shows the correspondence of state space computation and various defined RAS s in accordance with an example embodiment.

FIG. 18 shows a computation result of a state space in accordance with an example embodiment.

FIG. 19 shows a RAS and its configuration in accordance with an example embodiment.

FIG. 20 shows a computation result of a state space in accordance with an example embodiment.

FIG. 21 shows a RAS and its configuration in accordance with an example embodiment.

FIG. 22 shows a computation result of a state space in accordance with an example embodiment.

FIG. 23 shows a RAS and its configuration in accordance with an example embodiment.

FIG. 24 shows a computation result of a state space in accordance with an example embodiment.

DETAILED DESCRIPTION

Figure 1:
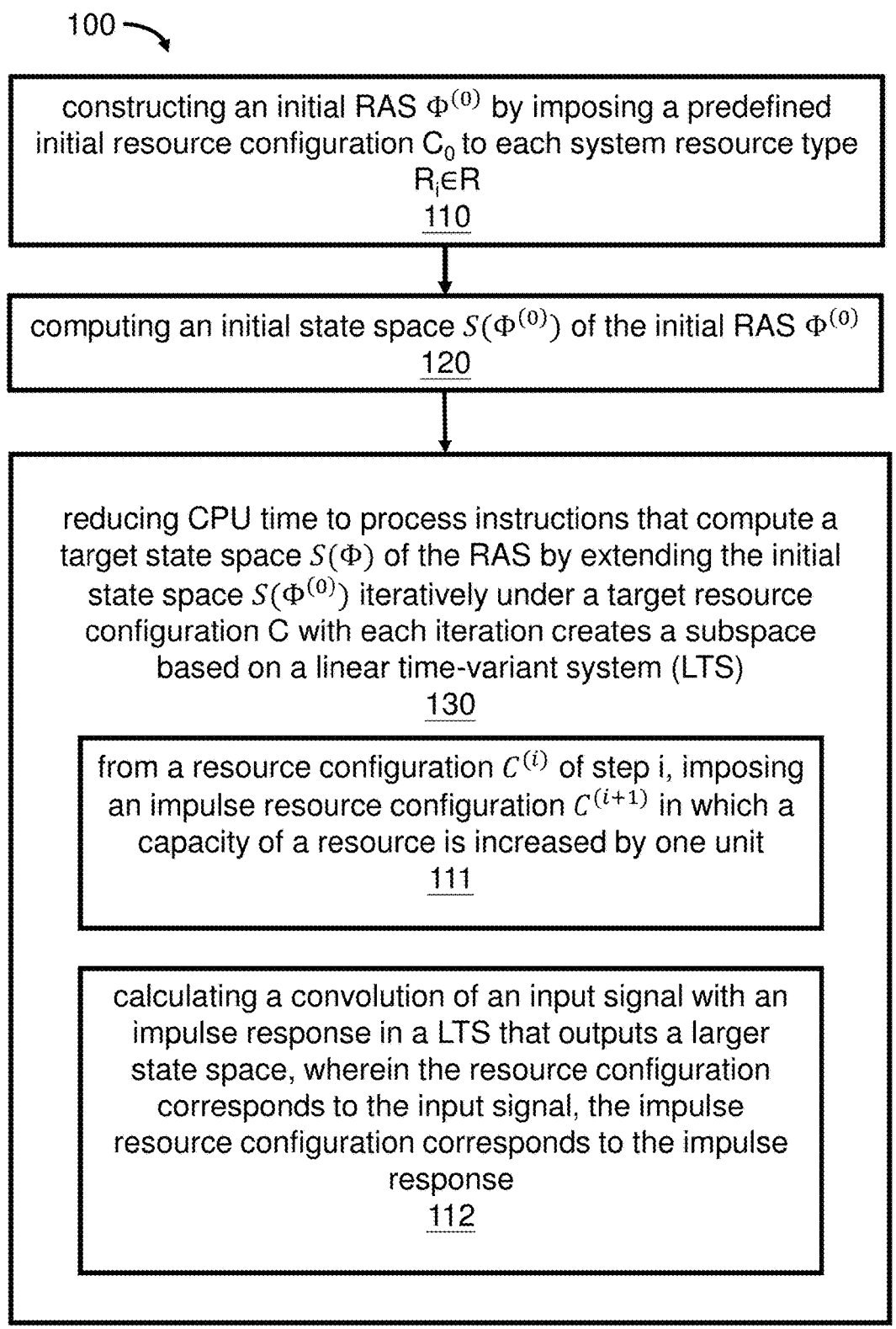
FIG. 1 shows a method that reduces CPU time to process instructions that compute a state space of a RAS in accordance with an example embodiment.

Example embodiments relate to apparatus and methods that reduce central processing unit (CPU) time to process instructions that compute a state space of a sequential resource allocation system (RAS) Φ that allocates a set of resources to multiple processes.

Computing the state space for a RAS is a ubiquitous problem in many contemporary information-intensive systems and involves the concurrent execution of various processes which compete for the acquisition of a set of shared resources. For example, manufacturing processes advance in a staged manner according to some sequential logic that is predefined by the production process planning. However, the solution to many problems in these systems may be blocked because of some factors that are specified during their progression.

The resource allocation paradigm can be found not only in flexibly automated production but also in various computer-integrated domains, such as mobile agents, public transportation systems and other service sectors, for example, complex routine in business sectors such as banking, telecommunications and the backend operations through the notion of an automated workflow management system (WMS). To optimally operate and manage a RAS, many attempts have sought to address the supervisory control problem that usually depends on the computation of its state space. However, an explicit state space enumeration is in general NP-hard for the diverse RAS classes, therefore, it has a negative impact on the efficiency to establish and deploy a supervisory control policy.

The resource allocation dynamics can be expressed in the framework through a Finite State Automaton (FSA) in the discrete event domain due to its state discrete and event-driven nature. In an FSA, liveness implies the absence of dead states in a system, which is closely related to the non-blockingness in the aforementioned framework. Such a permanent blocking which can be described by the stoppage of the involved resources is a deadlock that usually degrades the performance of the underlying system and even leads to serious results in highly automated systems. The state space representation can be formalized as an automaton, presented as a vector space, or can be any combination thereof. Another important formalism which has been extensively affected by their control paradigm is that of Petri nets (PN). Many problems in discrete event systems can be handled by Petri nets.

Deadlock control is a typical supervisory control problem in an RAS, which is, in the Petri net formalism, generally classified into three categories, namely, deadlock prevention, deadlock detection and recovery, and deadlock avoidance. Deadlock detection requires the identification of the deadlocks periodically, which may become more complex if various types of resources are considered. A deadlock avoidance technique dynamically examines the system states to ensure that a deadlock never occurs by disabling some events through an online decision mechanism. However, this approach is also impeded by the large state space and high online computational overheads. A deadlock prevention approach always uses an off-line computational mechanism to prevent a system from reaching deadlock states by imposing constraints on the system evolution via disabling the occurrences of some controllable events at particular states. The seminal results to design supervisors for supervisory control problems which deal mainly with the safety of a plant can be extensively found. For example, the liveness of Petri nets modeling many RAS in manufacturing is closely related to the non-emptiness of siphons that are a structural object in a PN. Yet, it is considered to be one of the most interesting achievements in the field of supervisory control of discrete event systems by the Petri net formalism. However, the number of siphons grows up exponentially with respect to the Petri net size and subsequently increases the structural complexity of the underlying controlled system. In fact, a liveness-enforcing supervisor is in general evaluated upon three significant criteria which are behavioral permissiveness, structural complexity, and computational complexity. For a PN, the computation of a maximally permissive, i.e., behaviorally optimal, liveness-enforcing supervisor usually depends on the reachability graph, which is a practically universal scheme for deadlock analysis and control. However, this technique suffers significantly from the state explosion problem.

It is well recognized that the analysis and solution to many problems arising in the RAS domain resort essentially to the reachability graph or state space generation which can be classified into three types: a full (complete) reachability graph; a compressed state space, for example, binary decision diagrams; and a reduced state space, e.g., coverability graph and a stubborn set. The types of compressed and reduced state spaces have the role to make the problem of a state explosion computationally tractable. Specifically, a large set of reachable markings can be represented with small shared data structures using the binary decision diagrams (BDDs). Particularly, the application of the BDD based state space representation has been extended where a number of algorithms have been provided to compute safe and unsafe subspaces based on liveness requirements, which is significant to design a maximally permissive liveness-enforcing supervisor from the computational tractability viewpoint.

The reachability analysis is one of the most general problems in the control analysis and synthesis of an RAS. Due to the inherent state explosion, generation of a reachability set or reachability graph readily becomes intractable even for moderately sized RAS with the known approaches although many efforts have been made to circumvent and ameliorate the notorious problem.

The implementation of the aforementioned policies tend to be quite stringent and the assessment of liveness is an NP-complete problem. Yet, a compact representation of the information that is necessary for the characterization of the maximally permissive liveness-enforcing supervisor (LES) is designed to mitigate the computational complexity of a large state space. An RAS space is dichotomized into safe and unsafe subspaces is a computationally difficult task. In order to deal with a large state space of a given RAS, a small subset is generated by an algorithm that selects some specific states from the entire state space based on predefined constraints on the premise that a complete state enumeration is available due to its manageable size or extraordinary memory of a computer. At the same time, this task requires the allocation of memory for the processing of state vectors. By linear inequalities, the behavior of the system is formalized. Various algorithms have been proposed in order to characterize of a parsimonious structure that allows the deployment of a maximally permissive LES. However, all the aforementioned methods depend on a complete enumeration of states of an RAS.

Example embodiments solve the above-stated problems or difficulties by providing new methods and apparatus that improve or facilitate the computation of a state space of a RAS.

Example embodiments include a method that reduces central processing unit (CPU) time to process instructions that compute a state space of a RAS that allocates a set of resources to multiple processes. Such example embodiments provide a significant advantage over conventional solutions by expediting computation of the state space and using less computer resources to execute the computation. For example, example embodiments execute with less CPU time (or process time) and require fewer instruction cycles (or fetch-decode-execute cycles).

Example embodiments can help to decide the reachability of a state without computing the whole state space. That is from a minimum capacities of the resources, and by computing the corresponding state space, the original system's behavior is inferred. Thus, computing the whole state space becomes unnecessary and the reachability of a given state can be done directly through an algebraic equation.

Example embodiments include methods to generate a state space in a decompositional and hierarchical way. Furthermore, the idea of divide-and-conquer can be traced in example embodiments. The de-composition and hierarchy mechanism to a large extent in example embodiments mitigate the computational intractability of the considered problem.

In one example embodiment, an initial RAS is constructed by a computer system by imposing a predefined initial resource configuration to each system resource type.

By way of example, an initial state space of the initial RAS is computed.

By way of example, the CPU time to process instructions that compute a target state space of the RAS is reduced by extending the initial state space iteratively under a target resource configuration.

By way of example, each iteration creates a subspace.

By way of example, each iteration includes imposing an impulse resource configuration in which a capacity of a resource is increased by one unit and calculating a convolution of an input signal with an impulse response in a linear time invariant system (LTS) that outputs a larger state space.

By way of example, in the LTS, the resource configuration corresponds to the input signal, the impulse resource configuration corresponds to the impulse response.

Example embodiments include a method that reduces CPU time to process instructions that compute a state space of a disjunctive/single-unit sequential resource allocation system (D/SURAS) operating over a computer network comprising a plurality of computers to allocate a set of resources to various processes.

Example embodiments provide technical solution which is efficient not only for the computation of the large space but also facilitates the differentiation of desirable and undesirable proprieties as specified in the requirement specification in a very compact manner.

Example embodiments stem from a result in LTS theory. An LTS the system output is the convolution of an input signal with its impulse response. When this principle is applied to the state space computation of an RAS, the impulse state space of an RAS with the impulse resource configuration is used to expose the structure topology information of an RAS. The selection of the impulse resource configuration, in addition to the generation of the impulse state space, in essential in the sense that it can make the corresponding state space be linear. Such a linearized state space admits the superposition principle with respect to a given resource configuration that is greater than the computed impulse resource configuration, which makes possible the algebraic characterization and operation of the target state space.

In an example embodiment, a given resource capacity configuration C corresponds to the system input of LTS, whereas an impulse resource configuration $C_0$ corresponds to the impulse response, which is used to find the impulse state space. Once these parameters are fixed, the state space of the system is computed through algebraic operations, which is highly efficient. The example embodiment is very tractable and easy to implement.

Example embodiments include a method to compute the state space of an RAS is expected to shape a methodology by properly using linear time-invariant systems. By dichotomizing the impulse state space into safe and unsafe subspaces, each state is assigned an attribute: a state in the safe subspace has the safety attribute while an unsafe state has the unsafety attribute. It is useful to expose the condition under which the safety or unsafety attribute is stable with respect to the derived states in a reconfigured state space. If all the states in a reconfigured RAS derived from the safe subspace of the impulse state space keep the safety attribute, and all the states in a reconfigured RAS derived from the unsafe subspace hold the unsafety attribute, the state space of the reconfigured RAS is naturally dichotomized. Then an online deadlock avoidance policy can be accordingly derived, which lead to optimal liveness-enforcing supervisor. This idea can be extended to an RAS under arbitrary control specifications.

A real-world RAS is usually structured due to the cost control and physical demand. However, the structural information cannot be effectively or formally represented in the framework of finite state automata. The loss of structural information makes the methods of state space computation always brute-force. Example embodiments can readily identify the useful structural information from the relationship between two neighboring state spaces.

FIG. 1 shows a method executed by a computer system that reduces CPU time to process instructions that compute a state space of a RAS $\Phi$ that allocates a set of resources to multiple processes in accordance with an example embodiment. By way of example, the output of the computer system is the computed state space.

Block 110 shows, by the computer system, constructing an initial RAS $\Phi^{(0)}$ by imposing a predefined initial resource configuration $C_0$ to each system resource type $R_i \in R$, wherein R is a set of system resource types.

Consider an example in which a given resource configuration corresponds to the system input.

Block 120 shows computing, by the computer system, an initial state space $S(\Phi^{(0)})$ of the initial RAS $\Phi^{(0)}$.

Consider an example in which the state space $S(\Phi^{(0)})$ is computed.

Block 130 shows reducing CPU time to process instructions that compute a target state space $S(\Phi)$ of the RAS by extending the initial state space $S(\Phi^{(0)})$ iteratively under a target resource configuration C with each iteration creates a subspace based on the LTS.

By way of example, block 130 includes block 111 and block 112.

Block 111 shows from a resource configuration $C^{(i)}$ of step i, an impulse resource configuration $C^{(i+1)}$ in which a capacity of a resource is increased by one unit is imposed.

Block 112 shows a convolution of an input signal with an impulse response in LTS is calculated and outputs a larger state space, in which the resource configuration corresponds to the input signal and the impulse resource configuration corresponds to the impulse response.

By way of example, an example embodiment starts from computing a very small-sized state space for a minimized number of resources capacities and in function of the impulse response. The state space is extended and expanded until obtaining the desired state space or the target state space $S(\Phi)$.

Figure 2:
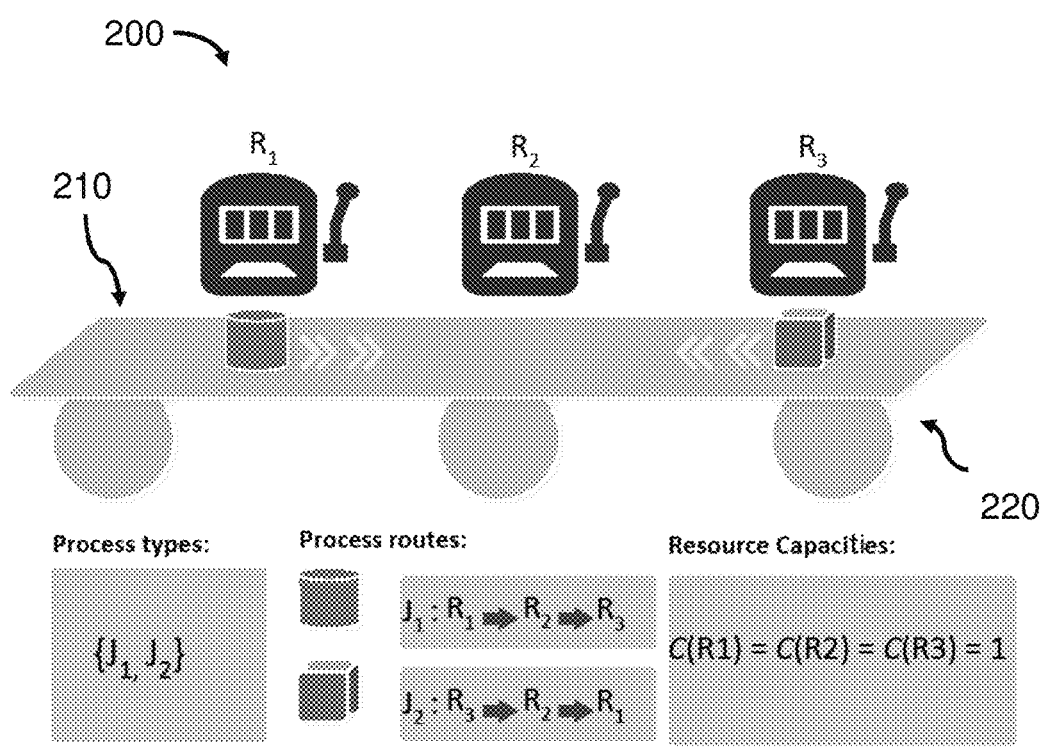
FIG. 2 shows an automated manufacturing cell in accordance with an example embodiment.

FIG. 2 shows an automated manufacturing cell 200. As illustrated, an example of deadlocks is encountered where a cell is composed of three workstations $R_1$, $R_2$ and $R_3$, a load/unload area 210 and a single Automated Guided Vehicle (AGV) 220 that transports the cell. Each product type arriving to the cell belongs to one of the two process types $J_1$ and $J_2$. From the two process instances, the cell can be stuck when the raw type $J_1$ is processed by $R_2$ and ask for the further advancement to the next workstation $R_3$ that has been occupied by a product type, with the raw type $J_2$ is processed by $R_2$ and ask for the further advancement to the next workstation $R_1$. This situation is called circular wait and requires an external interference to continue its process plans.

The control scheme of this example can be more complex if a resource in the cell has a non-unit capacity. In such a case, the major problem is that the state space grows exponentially large with respect to the structural size of the resource allocation topology (RAT) and its resource configuration, which are denoted by $\Omega$ and C, respectively. As a result, an RAS $\Phi$ is naturally defined as a two-tuple $\Phi=(\Omega, C)$. The computation of the state space of an RAS ($\Omega$, C), denoted by S($\Omega$, C), is an NP-hard problem and usually the first step that enables the application and implementation of a supervisory control strategy in the logical level of resource allocation systems.

Example embodiments solve the above-stated problems by providing technical solutions in new methods and apparatus that overcome the deficiency of inefficiently computing the state space S($\Omega$, C) of an RAS ($\Omega$, C).

In an example embodiment, an impulse state space S($\Omega$, $C_0$) of an RAT $\Omega$ is firstly found, where $C_0$ is called the impulse resource configuration. Given a resource configuration C for $\Omega$, S($\Omega$, C) can be obtained via algebraic operations of C over S($\Omega$, $C_0$), denoted by S($\Phi$)=S($\Omega$, C)=$\int_{C_0}^{C} S(\Omega,.)$.

Due to the various RAS classes, the relevant class of RAS is specified using the RAS taxonomy presented in Table 310 in FIG. 3. Example embodiments are essentially relevant to RAS s that are defined by two proprieties: the sequential logic has a number of alternative plans; and all the resource requests require a single unit. By way of example, a state space of a disjunctive/single-unit sequential resource allocation system (D/SURAS) is constructed.

The basic concepts and properties of sequential resource allocation systems in example embodiments are defined by definition 1. $\mathbb{N}$, $\mathbb{N}^+$, and $\mathbb{N}_m$ are used to denote the sets $\{0, 1, 2, \ldots\}$, $\{1, 2, \ldots\}$, and $\{1, 2, \ldots, m\}$, respectively.

Definition 1

A resource allocation system $\Phi=(\Omega, C)$ is a two-tuple, where

1) $\Omega=\langle R, P, D \rangle$ is the resource allocation topology, representing the system organization structure by specifying resource requirements for each processing stage to be completed in a system.
2) $R=\{R_1, \ldots, R_m\}$ is the set of system resource types.
3) $C: R \rightarrow \mathbb{N}^+$ is a system resource configuration or system capacity function defined by strictly positive integers that represent the number of units or the capacity of each resource type involved in the system. It is assumed that the resources are available at any time and any allocation request does not affect their functions during execution, which renders them reusable and conservative. Thus, $C(R_i) \equiv C_i$ is a system invariant for each i.
4) $P=\{\Pi_1, \ldots, \Pi_n\}$ no denotes the set of the system process types. Each process type $\Pi_j$ is composed by two elements, i.e., $\Pi_j=\langle \Delta_j, \Upsilon_j \rangle$, where $\Delta_j = \{\Xi_{j1}, \ldots, \Xi_{j,l_j}\}$ is the set of processing stages involved in the definition of process type $\Pi_j$, and $\Upsilon_j$ is an acyclic digraph with its node set, $Q_j$, related to the set $\Delta_j$. Let $Q_j^s$ denotes the set of source nodes of $\Upsilon_j$ and $Q_j^s$ denotes the set of sink nodes of $\Upsilon_j$. Thus, a process plan for process type $\Pi_j$ is defined by such a path from some node $q_s \in Q_j^s$ to some node $q_t \in Q_j^s$. The set of all processing stages in $\Omega$ is denoted by $\Delta \equiv \bigcup_{j=1}^n \Delta_j$ and $\xi \equiv |\Delta|$.
5) D: $\bigcup_{j=1}^n \Delta_j \rightarrow \prod_{i=1}^m \{0, \ldots, C_i\}$ is the resource allocation function. It associates every processing stage $\Xi_{jk}$ with the resource allocation vector $D(\Xi_{ij})$ in order to define its execution requirement. At any particular time, the system executes one of its processing stages which itself contains a number of instances of each process type. In order to advance from a processing stage $\Xi_{ij}$ to some of or its next stage(s) $\Xi_{i,j+1}$ except for process instances which executes a non-terminal stage, the resource differential $(D(\Xi_{i,j+1})-D(\Xi_{ij}))^+$ should be allocated. Therefore, the resource units $(D(\Xi_{i,j+1})-D(\Xi_{ij}))^-$ that are not needed anymore is released.

The protocol of the considered resource allocation requires that for such a resource type $R_i \in R$, it should not be over-allocated with respect to its capacity $C_i$ at any execution time instant, i.e., $D(\Xi_l)[i] \leq C_i$, $\forall l=1, 2, \ldots, \xi$ in accordance with an example embodiment. Finally, for the sake of simplicity, let $|\Phi|$ denotes the size of the underlying RAS $\Phi$, where $|\Phi| \equiv |R|+\xi+\sum_{i=1}^m C_i$ in an example embodiment.

In example embodiments, the dynamics of the sequential resource allocation system as a finite state automaton (FSA) is formalized below. By way of example, the dynamics of the D/SURAS $\Phi=\langle R, C, P, D \rangle$ is formulated by a deterministic finite state automaton (DFSA) $\langle S, E, f, \Gamma, s_0, S_M \rangle$ where:

(i) S is the state set consisting of $\xi$-dimensional vectors s. The components of s are s[l], l=1, ..., $\xi$, which corresponds to the RAS processing stages. They indicate the number of process instances executing the corresponding stage in the considered RAS state. Thus, all the vectors $s \in \mathbb{N}^\xi$ create the set S and they satisfy the following Equation $$\forall i = 1, \ldots, m, \sum_{l=1}^{\xi} s[l] \cdot D(\Xi_l)[i] \leq C_i \qquad \text{Eq. (1)}$$

where $D(\Xi_l)$ is the allocation request to the resource $R_i$ posed by a stage $\Xi_l$.

(ii) The event set E denotes the union of the disjoint event sets $E^\prime$, $\overline{E}$ and $E^\backprime$ that are defined as follows:

a) $E^\prime = \{e_{rp}: r=0, \Xi_p \in \bigcup_{j=1}^n Q_j^s\}$, where an event $e_{rp}$ denotes that a new process instance is loaded from a processing stage $\Xi_p$.
b) $\overline{E}=\{e_{rp}: \exists j \in \mathbb{N}_n \text{ s.t. } \Xi_p \text{ is a successor of } \Xi_r \text{ in graph } \Upsilon_j\}$, that is, $e_{rp}$ represents the situation of advancing from a stage $\Xi_r$ to a successor stage $\Xi_p$ after the execution of an activated process instance.
c) $E^\backprime = \{e_{rp}: \Xi_r \in \bigcup_{j=1}^n Q_j^s, p=0\}$ that is, $e_{rp}$ denotes that a finished process instance is unloaded after executing its last stage $\Xi_r$.

(iii) f:S×E→S is the state transition function which is defined by $s_0=f(s, e_{rp})$, where each component of the state vector s0 is given by:

$$s'[l] = \begin{cases} s[l]-1, & \text{if } l=r \\ s[l]+1, & \text{if } l=p \\ s[l], & \text{otherwise} \end{cases}$$

$f(s, e_{rp})$ is a partial function provided that the state $s' \in S$ is defined.

(iv) $\Gamma: S \rightarrow 2^E$ is the set of events $e \in E$ for which f(s, e) is defined. It denotes the feasible event function for each state $s \in S$.

(v) $s_0=0$ is the initial state in which all the components of its state vector are equal to zero. The initial state presents the situation of the system in which no process instances are initialized.

(vi) $S_M$ denotes the set of marked states in the singleton $\{s_0\}$, and it definitely characterizes the complete process runs.

It is denoted by $\hat{f}$ the natural extension of the state transition function f to S×E*. Then, for any s∈S and an empty event string ε:

$$\hat{f}(s,\epsilon)=s$$

In addition, for a given state s∈S,σ∈E*, $\hat{f}$ is always extended from domain X×E to domain X×E*, such that $$\hat{f}(s,\sigma e)=f(\hat{f}(s,\sigma),e)$$

The DFSA G(Φ) generates the language L(G) that describes formally the behavior of the considered RAS Φ by all σ∈E* such that $\hat{f}(s_0, \sigma)$ is defined, i.e., $$L(G)=\{\sigma: \sigma\in E^*|\hat{f}(s_0,\sigma)!\}$$

The reachable subspace by the subset $S_r$ of S is defined as follows:

$$S_r \equiv \{s\in S: \exists \sigma\in L(G)|\hat{f}(s_0,\sigma)=s\} \qquad \text{Eq. (4)}$$

The safe subspace $S_s$ of G(Φ) is defined by:

$$S_s \equiv \{s\in S: \exists \sigma\in E^*|\hat{f}(s,\sigma)=s_0\} \qquad \text{Eq. (5)}$$

Let the complements of $S_r$ and $S_s$ be denoted by $S_{\bar{r}}$ and $S_{\bar{s}}$, respectively, which are called unreachable and unsafe subspaces. Also, let $S_{xy}$, x∈{r, $\bar{r}$}, y∈{s, $\bar{s}$}, denote the intersection of the corresponding sets $S_x$ and $S_y$.

In an example embodiment, the marked language $L_m(G)$ of G(Φ) is defined by the set of marked states $S_M$ as follows:

$$L_m(G) \equiv \{\sigma \in L(G): \hat{f}(s_0, \sigma) \in S_M\} = \{\sigma \in L(G): \hat{f}(s_0\sigma) = s_0\}$$

The marked language $L_m(G)$ consists of the strings σ for which $\hat{f}(s_0, \sigma)\in S_M$, i.e., these strings characterize a complete process run if and only if (iff) s∈$S_s$. Besides, Eqs. (4) and (5) combined together, are exactly equal to the marked language $L_m(G)$.

Thus, the desired behavior of a given D/SURAS can be expressed by the marked language of G(Φ) in an example embodiment. An immediate consequence is that starting from the initial state $s_0$, a maximally permissive liveness-enforcing supervisor (LES) should disable the activation of such a process instances which leads to the advancement to a next state s that does not belong to $S_s$.

In an RAS of a example embodiment, ∀s, s'∈S, s is said to be less than $s_0$, denoted by s≤$s_0$, if ∀l∈{1, 2, . . . , ξ}, s[l]≤s'[l].

Proposition 1

Let s, s'∈S be two states in an RAS Φ.

1) s∈$S_s$∧s'≤s⇒s'∈$S_s$
2) s∈$S_{\bar{s}}$∧s'≥s⇒s'∈$S_{\bar{s}}$

Proposition 1 describes two small subsets of the state space of an RAS in an example embodiment, which can reduce the computational overhead when an LES is developed.

The implementation of an effective LES depends essentially on the recognition and the blockage of the transitions that bridge the safe region to the unsafe or deadlock zone. However, deciding whether a state is safe or unsafe is an NP-complete problem, which is true for the most classes of disjunctive/conjunctive RASs.

The example embodiments reveal that there are some proprieties which relate the expansion of the state space to the structural proprieties of the RAS. First, an initial resource configuration $C_0$ should be determined by finding the minimal resource configuration that is required for computation. An RAS is denoted by $\Phi_0=\langle\Omega; C_0\rangle$ and its state space by $S(\Omega; C_0)$. Next, the state space $S(\Omega; C_0)$ is extended and expanded through some proprieties related to the resource configuration C until the large state space $S(\Phi)\equiv S(\Omega; C)$ is generated.

In one example embodiment, for a D/SURAS Φ, the computation of its state space essentially requires: imposing a very small enough capacity to each resource type $R_i\in R$ to construct a new RAS, denoted by $\Phi^{(O)}=\langle\Omega^{(O)}; C_0\rangle$, which has the some shared proprieties with Φ except for its predefined configuration C; computing the state space $S(\Phi^{(O)})$; and constructing the target state space $S(\Phi)\equiv S(\Omega; C)$ by extending the state space $S(\Phi^{(O)})$ iteratively until obtaining the target state space under resource configuration C. Each iteration creates a subspace of S and it consists of (a) from a configuration $C^{(i)}$ that corresponds to the input signal, an impulse resource configuration $C^{(i+1)}$ in which a capacity of a given resource is increased by one unit is imposed; and the convolution is computed via an algebraic operation which output a larger state space.

Definition 2

In one example embodiment, let Φ=⟨Ω, C⟩ be a D/SU-RAS with Ω=⟨R, P, D⟩, where P={$\Pi_1$, . . . , $\Pi_n$} denotes the set of system process types. $R_\alpha\in R$ ($\alpha\in\mathbb{N}_m$) denotes the resource whose capacity is increased by one. Let $\Gamma(R_\alpha)=\{\Pi_i|\Pi_i=\langle\Delta_i, \Upsilon_i\rangle, \Delta_i=\{\Xi_{i1}, \Xi_{i2}, \ldots, \Xi_{i,l1}\}, \exists\Xi\in\Delta_i, D(\Xi)[\alpha]\neq 0\}$ denotes the set of process types in which the execution of some processing stages involves the resource $R_\alpha$. The RAS $\Phi^{(1)}=\langle\Omega^{(1)}, C^{(1)}\rangle$ with $\Omega^{(1)}=\langle R^{(1)}, P^{(1)}, D^{(1)}\rangle$ is called a reconfigured RAS of Φ if and only if:

$$R^{(1)} = R$$

$$C_i^{(1)} \begin{cases} C_i + 1 & \text{if } i = \alpha \\ C_i & \text{otherwhise} \end{cases}$$

$P^{(1)}$ is the same with P in the original RAS, representing the data structures that defines the sequential logic over the processing stages $D^{(1)}: \cup_{j=1}^n \Delta_j \to \Pi_{i=1}^m\{0, \ldots, C_i^{(1)}\}$ is reconfigured resource allocation function, indicating the number of units required to execute a processing stage in the reconfigured RAS.

The resource allocation vector $D^{(1)}(\Xi_{ij})$ is also a ξ-dimensional vector. The term reconfiguration denotes the fact of extending the RAS from $\Phi^{(i)}$ to $\Phi^{(i+1)}$, i=0, 1, 2, . . . .

Property 1

In one example embodiment, let $\Phi^{(O)}=\langle\Omega^{(O)}; C_0\rangle$ be a D/SURAS and $C^{(1)}, C^{(2)}, \ldots, C^{(h)}$ denote the iterative resource reconfigurations applied to $\Phi^{(O)}$, leading to $\Phi^{(1)}$, $\Phi^{(2)}, \ldots, \Phi^{(h)}$ as defined above, respectively. In sets $S(\Phi^{(1)})$, $S(\Phi^{(2)}), \ldots, S(\Phi^{(h)}))$ generated by the impulse state spaces) $S(\Omega^{(O)}; C_0)$, ∀i∈$\mathbb{N}_h$, ∀s∈$S(\Phi^{(i)})$, s∈$\mathbb{N}^{|\xi|}$.

As defined in Definition 1, D: $\cup_{j=1}^n\Delta_j\to\Pi_{i=1}^m\{0, \ldots, C_i\}$. By increasing the capacity of $R_\alpha\in R$, performing a reconfiguration does not require a new process instance since the RAS $\Phi^{(1)}$ defines the same process types of $\Phi^{(O)}$ and as defined in Definition 2, $\Phi^{(O)}$ and $\Phi^{(i)}$ have the same resource set, where i=1, 2, . . . , h. Hence, we have $|\Delta|=|\Delta^{(i)}|\equiv\xi$.

Let y and y' be two vectors in the state space of the RASs $\Phi^{(O)}$ and $\Phi^{(1)}$, respectively. Suppose that $\Phi^{(1)}=\langle\Omega^{(1)}; C^{(1)}\rangle$ is obtained from the RAS $\Phi^{(O)}=\langle\Omega^{(O)}; C_0\rangle$ after an impulse resource configuration of the considered system, e.g., in FIG. 2, $R_\alpha=R_2$. It should be naturally true that vectors $y\in S(\Phi^{(0)})$ and $y'\in S(\Phi^{(1)})$ have the same number of components. As defined in Definition 2:

$$R^{(1)}=R=\{R_1, R_2, \ldots, R_3\}$$

$$C_1^{(1)}=C_3^{(1)}=C_1=C_3, C_2^{(1)}=C_2+1=2$$

$\Phi^{(0)}$ and $\Phi^{(1)}$ in FIG. 2 have the same number of process types $\{\Pi_1, \Pi_2\}$ and involve the same resource types. Hence, the set of processing stages of $\Phi^{(0)}$ can be written as $\Delta=\{\Xi_{11}, \Xi_{12}, \Xi_{13}, \Xi_{21}, \Xi_{22}, \Xi_{23}\}$, which means that $\xi=|\Delta|=6$. In addition, let $\Delta^{(1)}$ be the set of processing stages of $\Phi^{(1)}$. According to the configuration of $\Phi^{(1)}$, $\Delta^{(1)}$ can be written as follows $\Delta^{(1)}=\{\Xi_{11}^{(1)}, \Xi_{12}^{(1)}, \Xi_{13}^{(1)}, \Xi_{21}^{(1)}, \Xi_{22}^{(1)}, \Xi_{23}^{(1)}\}$, which means that $|\Delta^{(1)}|=6$. Therefore, $|\Delta|=|\Delta^{(1)}|=6$ which verifies Property 1. As an example of two vectors y and y' in FIG. 2, let $y=[1, 1, 1, 0, 0, 0]$ and $y'=[1, 0, 1, 0, 0, 0]$, where $y\in S(\Phi^{(0)})$ and $y'\in S(\Phi^{(1)})$. It can be seen that y, y'$\in \mathbb{N}^6$.

Proposition 2

Let $\Phi^{(0)}=\langle\Omega^{(0)}; C_0\rangle$ be a D/SURAS and $\Phi^{(1)}=\langle\Omega^{(1)}; C^{(1)}\rangle$ be a reconfigured version in one example embodiment. The state space of $\Phi^{(0)}$ forms a proper subset of $S(\Phi^{(1)})$, viz., $S(\Phi^{(0)})\subset S(\Phi^{(1)})$.

To establish the result, it suffices to show that the elements in $S(\Phi^{(0)})$ are also reachable in $(\Phi^{(1)})$. For this, by Property 1 that the state set $S(\Phi^{(1)})$ also consists of $\xi$-dimensional vectors s'. The RAS $\Phi^{(0)}$ and $\Phi^{(1)}$ have the same processing routes and stages except for the capacity of the resources. Therefore, both RASs have the same process sequential logic. Let $\sigma\in E^*$ be a feasible event sequence in $\Phi^{(0)}$ with $s=\tilde{f}(s_0, \sigma)$. It is inferred that $\sigma$ is also feasible in $\Phi^{(1)}$ by not allocating the reconfigured resource unit in $R\alpha$ to any process instance, i.e., $\forall s\in S(\Phi^{(0)})$, $s\in S(\Phi^{(1)})$.

On the other hand, the full allocation of reconfigured resource units in $R\alpha$ can lead to new states in $S(\Phi^{(1)})$ that do not belong to $S(\Phi^{(0)})$.

Analogously, the elements of $S(\Phi^{(i)})$ can be extracted from $S(\Phi^{(i+1)})$ by deallocating the additionally reconfigured capacity in the resource $R\alpha$. The RAS $\Phi$ of the considered system in FIG. 2 has 20 reachable states. Suppose that $R_\alpha=R_2$. Then the capacity of $R_2$ is 2 in $\Phi^{(1)}$ that has 47 states, 20 of which are exactly the states in $S(\Phi)$. Proposition 2 shows that the computed state space after increasing the capacity of a resource type in a considered RAS contains all the states of the previous RAS. However, it cannot fully represent the state space of the reconfigured RAS which has more reachable states. For that, it is claimed that the new states can be computed based on the following result.

Theorem 1

Let $\Phi=\langle\Omega; C\rangle$ be a D/SURAS and $\Phi^{(1)}=\langle\Omega^{(1)}; C^{(1)}\rangle$ be a reconfigured RAS by appending one unit capacity to a resource type $R_\alpha\in R(\alpha\in\mathbb{N}_m)$. Suppose that $S(\Phi)=\{s_1, s_2, \ldots, s_k\}$. Define a vector $s^{(1)}$ by:

$$\forall i=1,\ldots,k, l=1,\ldots,\xi, s_i^{(1)} = \begin{cases} s_i[l]+1 & \text{if } D(\Xi_l)[\alpha]\neq 0 \\ s_i[l] & \text{otherwhise} \end{cases} \quad \text{Eq. (7)}$$

Then any vector $s^{(1)}$ obtained by Eq. (7) is a state vector in $S(\Phi^{(1)})$, i.e., $s^{(1)}\in S(\Phi^{(1)})$.

As to show that any state vector computed by Eq. (7) conform to the sequential logic that defines the process routes and furthermore, no resource type $R_i^{(1)}\in R^{(1)}$ is overly allocated with respect to its capacity $C_i^{(1)}$.

In contrast with $S(\Phi)$, the new states in $S(\Phi^{(1)})$ stem from the new activation of the process instances represented by processing stage $(\Xi_l)$ that needs resource $R_\alpha$ when a new unit is added to the resource type $R_\alpha\in R$. By Proposition 2, the state space $S(\Phi)$ is a proper subset of $S(\Phi^{(1)})$. Therefore, the elements in $S(\Phi^{(1)})$ conform to the resource allocation constraint defined in Eq. (1).

The state space of $S(\Phi^{(1)})$ can be classified into two categories based on the allocation requests to the resource $R_\alpha$ posed at any stage $\Xi_l$, $l\in\mathbb{N}_\xi$. According to the resource allocation topology of an RAS, the process instances which request the resource $R_{i=\alpha}$ are exactly those of the process routes that do not acquire $R_{i=\alpha}^{(1)}$. Similarly, the process instances which compete the resource $R_{i=\alpha}$ are those of the process routes that request $R_{i=\alpha}^{(1)}$ their execution cycles. Now, based on this discrimination of process routes with respect to the resource type $R_\alpha$, two cases are identified and defined:

Case I $R_i\in R$, $R_i\neq R_\alpha$: In this case, the capacities of the resource types $R_i$'s remains invariant since the reconfiguration modifies the capacity of $R_\alpha$ only. The resource allocation requests posed by the process instances represented by $\Xi_l$ with $D(\Xi_l)[\alpha]=0$ are the same with $\Phi$. Since every states $s^{(1)}\in S(\Phi^{(1)})$ defines the advancement of these process instances which does not require the additional unit in $R_\alpha$, the process instances executing the corresponding stage of this type requires the same allocation of the resources defined by the sequential logic of $\Phi$. Hence, the following condition is inferred:

$$\forall i=1,\ldots,m, i\neq\alpha, \sum_{l=1}^{\xi} s^{(1)}[l]\cdot D(\Xi_l)[\alpha]\leq C_i=C_i^{(1)}$$

Case II $R_i\in R$, $R_i=R_\alpha$: Considering that the process instances request the resource type $R_\alpha$, it is claimed the following constraint with respect to the states in $S(\Phi^{(1)})$:

$$\forall l=1,\ldots,\xi, \sum_{l=1}^{\xi} s^{(1)}[l]\cdot D(\Xi_l)[\alpha]\leq C_\alpha^{(1)}$$

Similarly, any state s in the impulse state space $S(\Omega; C)$ satisfies $$\forall l=1,\ldots,\xi, \sum_{l=1}^{\xi} s^{(1)}[l]\cdot D(\Xi_l)[\alpha]\leq C_\alpha \quad \text{Eq. (10)}$$

By Definition 2, $C_\alpha^{(1)}=C_\alpha+1$. Below is to prove that if Eq. (7) is applied to any state vector $s\in S(\Phi)$, the constraint represented by Eq. (9) is satisfied. Two categories of states in $S(\Phi)$ are extracted. The first category contains the states satisfying $\Sigma_{l=1}^\xi s[l]\cdot D(\Xi_l)[\alpha]<C_\alpha$ and the second category includes the states satisfying $\Sigma_{l=1}^\xi s[l]\cdot D(\Xi_l)[\alpha]=C_\alpha$. The two kinds of states are denoted as $G_1$ and $G_2$, respectively. Hence, $S(\Phi)=G_1\cap G_2$ with $G_1\cup G_2=\emptyset$.

Suppose that Eq. (7) is applied to the state vectors in $G_1$. The processing stage allocates an additional unit to the process instances requesting $R_\alpha$. By the definition of state vectors in $G_1$, it can be seen that the number of units allocated from the resource $R_\alpha$ is strictly less than the capacity of $R_\alpha$. Consequently, when we allocate an additional unit to the process instances which request $R_\alpha$, at most $C_\alpha$ units are allocated. In addition, the components of the state vector s respect the allocation requirements defined in Eq. (9) because of $C_\alpha < C_\alpha^{(1)}$. Thus, for any state s in the impulse state space, the following equation $$\forall l = 1, \ldots, \xi, \sum_{l=1}^{\xi} s^{(1)}[l] \cdot D(\Xi_l)[\alpha] \leq C_\alpha \leq C_\alpha^{(1)} \quad \text{Eq. (11)}$$

is, similar to Eq. (10), satisfied. By combining Eq. (11) with Proposition 2, it is concluded that that the computed state vectors from $G_1$ by Eq. (7) can be found in the impulse state space $S(\Omega, C)$.

For the second category, the new unit added to the resource $R\alpha$ is allocated to the process instances that request it. Now, if summing up the number of units allocated for the process instances that request $R_\alpha$, then it is exactly $C_\alpha + 1$ units. This operation is equivalent to the advancement from a processing stage to the next stage, both of which need resource $R_\alpha$, which is not possible during the resource configuration $C_\alpha^{(0)}$ since at least $C_\alpha + 1$ units are allocated, which is exactly equal to $C_\alpha^{(1)}$. In other words, the components of $s^{(1)}$ will allocate the additional unit. Thus, $$\sum_{l=1}^{\xi} s^{(1)}[l] \cdot D(\Xi_l)[\alpha] = C_\alpha^{(1)} \quad \text{Eq. (12)}$$

The obtained results lead to the truth of theorem 1.

A state $s \in S(\Omega, C)$ can derive multiple states in $S(\Omega^{(1)}, C^{(1)})$. Let $S^{(1)}(s)$ denote the set of derived states in $S(\Omega^{(1)}, C^{(1)})$ from a state $s \in S(\Omega, C)$ by Theorem 1. A state $s^{(1)}$ derived from a state $s \in S(\Omega, C)$ is denoted by $s^{(1)} \vDash s$. Then we have $S^{(1)}(s) = \{s^{(1)} | s^{(1)} \vDash s, s \in S(\Omega, C)\}$.

Figure 4:
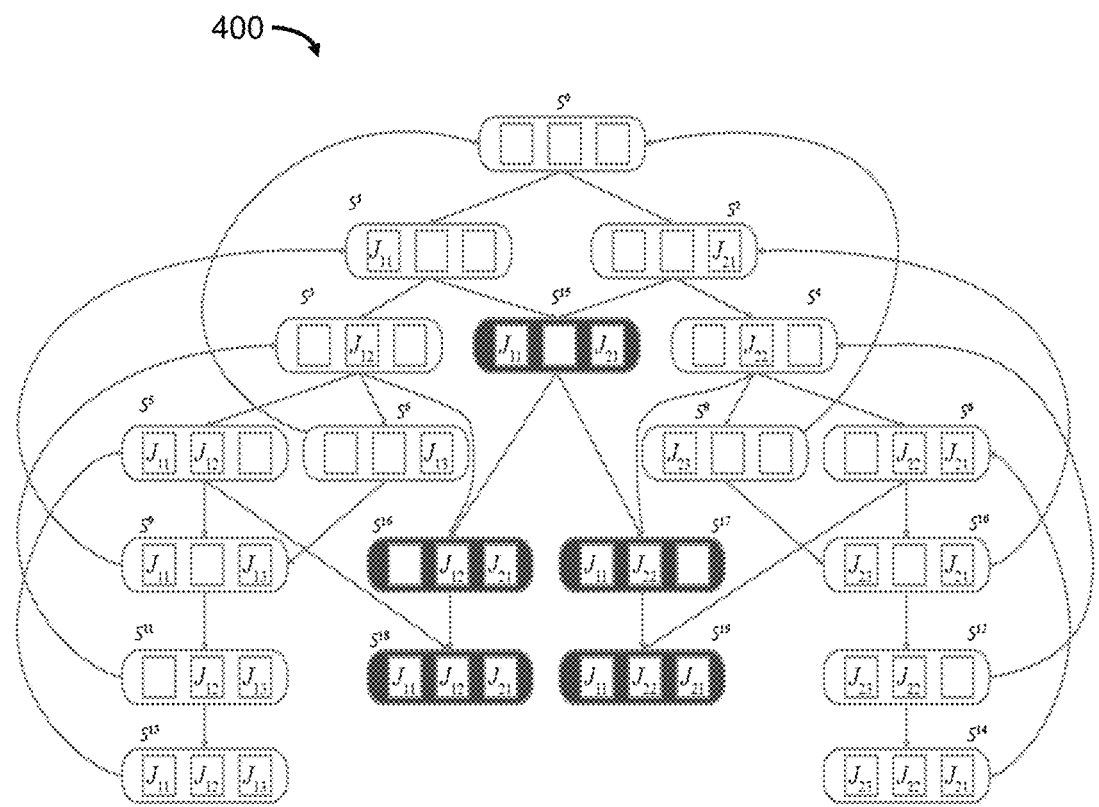
FIG. 4 shows the reachable state space in accordance with an example embodiment.

FIG. 4 shows the Reachable state space in one example embodiment. Let $y = [0, 1, 0, 1, 0, 0] = s_{16}$ and $R_\alpha = R_2$. Then, two process instances compete $R_2$, namely $\Xi_{12}$ and $\Xi E_{22}$. By applying Eq. (7), two vectors $s_1^{(1)} = [0, 1, 0, 1, 1, 0]$ and $s_2^{(1)} = [0, 2, 0, 1, 0, 0]$ are obtained that are the elements in $S(\Phi^{(1)})$, i.e., $S^{(1)}(s_{16}) = \{s_1^{(1)}, s_2^{(1)}\}$. By Theorem 1, one can obtain the following equations:

$$\forall s \in S(\Phi^{(1)}), \forall i = 1, \ldots, m, i \neq \alpha, \sum_{l=1}^{\xi} s[l] \cdot D(\Xi_l)[\alpha] \leq C_i = C_i^{(1)} \quad \text{Eq. (9)}$$

and $$\forall s \in S(\Phi^{(1)}), \sum_{l=1}^{\xi} s[l] \cdot D(\Xi_l)[\alpha] \leq C_\alpha^{(1)}$$

In one example embodiment, let $\Phi = \langle \Omega, C \rangle$ be a D/SU-RAS and $\Phi^{(1)} = \langle \Omega^{(1)}, C^{(1)} \rangle$ be a re configured RAS by appending one unit capacity to a resource type $R_\alpha \in R$ ($\alpha \in \mathbb{N}_m$). Let $S(\Phi) = \{s_1, s_2, \ldots, s_k\}$ and $S(\Phi^{(1)})$ be the state space of $\Phi$ and its reconfigured RAS $\Phi^{(1)}$, respectively. Suppose that $s^{(1)}$ is a computed vector by Theorem 1. Then, $$\bigcup_{s_i \in S(\Phi)} S^{(1)}(s_i) = S(\Phi^{(1)})$$

To authenticate the result, it is equivalent to show that all the combinations of vectors generated by Theorem 1 represent $S(\Phi^{(1)})$. Any state vector generated by Eq. (7) is an element of the (output) state space $S(\Phi^{(1)})$, i.e., $\bigcup_{s_i \in S(\Phi)} S^{(1)}(s_i) \subset S(\Phi^{(1)})$ in Theorem 1 is proved. Accordingly, the generated states covers all the output space $S(\Phi^{(1)})$ have to be shown.

By Eq. (11), $S(\Phi) \subseteq S(\Phi^{(1)})$ and by Eq. (12), different combinations of possible vectors satisfy the constraint in $S(\Phi^{(1)})$. Thus, it is concluded that the set of vectors that are generated from $S(\Phi)$ using Theorem 1 creates the exact state space of $S(\Phi^{(1)})$.

Figure 5:
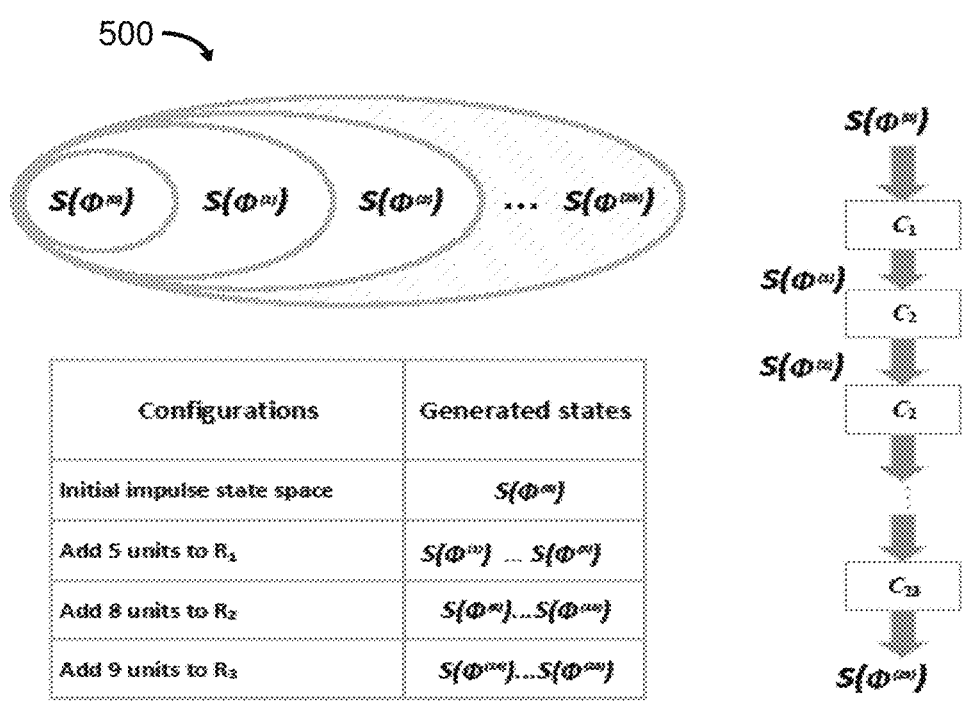
FIG. 5 shows the generation of the large state in accordance with an example embodiment.

FIG. 5 shows the generation of the large state in an example embodiment. Considering the D\SU RAS $\Phi$ with the capacity of resources types $C_1=6$, $C_2=9$, and $C_3=10$, as shown in FIG. 5, a new RAS with single-unit capacities is created and its state space $S(\Phi)$, i.e., the impulse state space is computed. The reconfigurations correspond to the increase of the capacities of resource types until reaching the specified capacities. For example, adding five units to $R_1$ in FIG. 2 by five reconfigurations, which means that Theorem 1 is applied to generate the corresponding state spaces $\Phi^{(1)}$, $\Phi^{(2)}, \ldots, \Phi^{(5)}$, respectively. Finally, after applying the necessary configurations, the state space of $\Phi^{(23)}$ is computed.

FIG. 6 shows a pseudocode 600 for algorithm 1 which is essential to generate the new state space after performing a resource reconfiguration, i.e., increasing the capacity of a given resource by one unit in an example embodiment. As $\Gamma(R_\alpha) = \{\Pi_i | \Pi_i = \langle \Delta_i, \Upsilon_i \rangle, \Delta_i = \{\Xi_{i1}, \Xi_{i2}, \ldots, \Xi_{i,l1}\}, \exists \Xi \in \Delta_i, D(\Xi)[\alpha] \neq 0\}$ denotes the set of process types in which the execution of some processing stages in them requests the resource $R_\alpha$. This algorithm is the implementation of Theorem 1. Suppose that the capacity of $R_2$ is increased to be one unit in the RAS shown in FIG. 2. The process types that to consider are $\Pi_1$ and $\Pi_2$ since $R_2$ is involved in their process plans and thus $\Gamma(R_2) = \{\Pi_1, \Pi_2\}$.

In one example embodiment, the while procedure in Algorithm 1 traverses the states in the impulse state space and for every state $s_i \in S(\Omega, C)$, a set of new state $s_i^{(1)}$ is created by first identifying $\Gamma(R_\alpha)$. Then, the process instances that are involved in the modification of the state $s_i$ are identified. This algorithm represents a reconfiguration that has only one additional unit in a given resource. Some process instances value $s_i[l]+1$ is taken as indicated. The other process instances take the same values in the vector $s_i$. The new state is added to the target state space $S(\Phi^{(1)})$.

In one example embodiment, the list Q is filled again by the states of $S(\Omega, C)$ and repeat the while procedure for every process type $\Pi \in \Gamma(R_\alpha)$. Algorithm 1 clearly reveals the strong relationship between the original state space and the generated one by identifying the process instances that are related to the reconfigured resource and the process types that involve it in their processing stages.

In the algorithm 1, the method of computing the state space from only one additional unit to a resource type is shown in accordance with an example embodiment.

It is required to provide an algorithm that fully generates the state space for a reconfiguration that comprises various configurations of different resource types.

FIG. 7 shows a pseudocode 700 for algorithm 2 which takes as input a state space $S(\Omega, C)$ and identifies the set of resources whose capacities are different from the reconfigured RAS. The set of these resources is denoted by $R^+$. By Algorithm 2, the capacity of each resource $R \in R^+$ is iteratively increased and its related state space is generated. A previously computed state space is used for the next iterative computation. Finally, when the capacities of the resources reached the specified configuration of $\Phi^{(1)}$, the algorithm returns the target state space $S(\Phi^{(1)})$.

In an example embodiment, the first step that enables the application of the aforementioned algorithms is choosing a correct initial resource configuration $C_0$. Indeed, for some cases, applying Algorithm 1 to compute the state space corresponding to a single reconfiguration cannot entirely compute the state space. Therefore, it becomes essential to define a method that help to choose the appropriate resources capacities that are required for accurate computation and reachability analysis.

Figure 8:
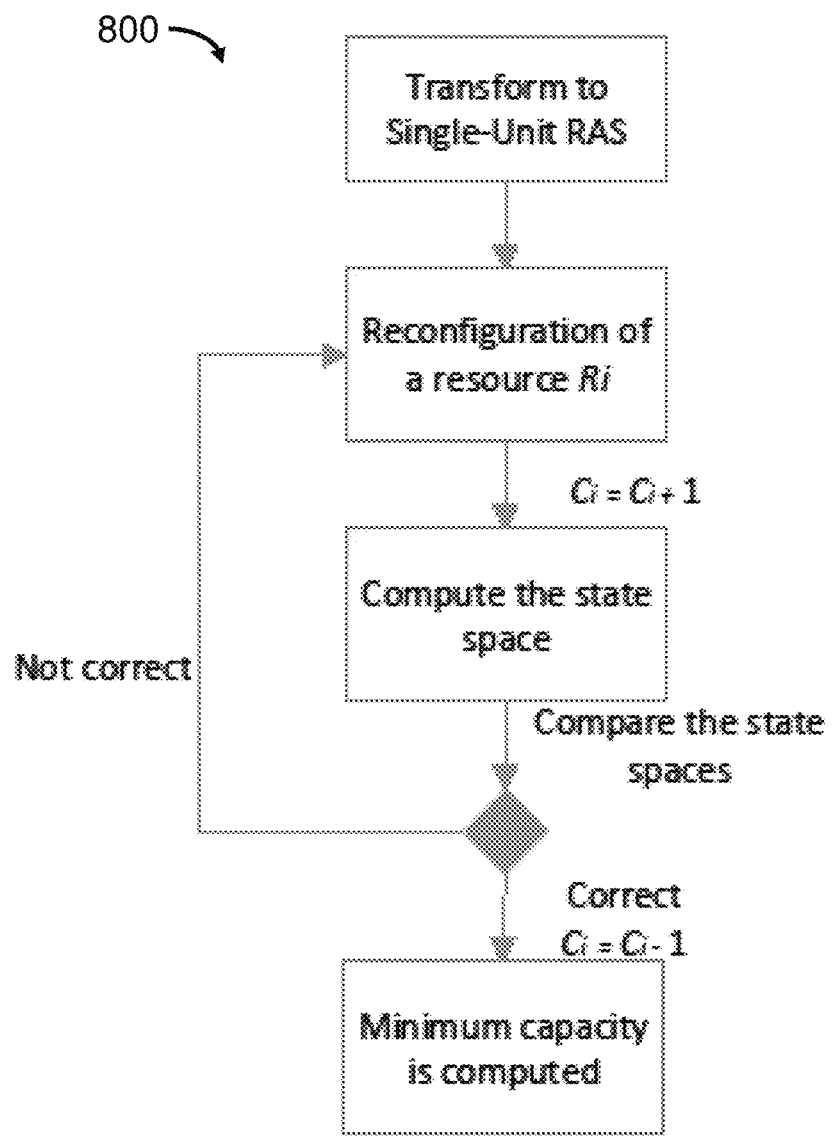
FIG. 8 shows a methodology to find the minimum capacity of a given resource in accordance with an example embodiment.

FIG. 8 shows the methodology to find a minimum capacity of a given resource in an example embodiment. First, a given single-unit RAS with non-unit capacities $\Phi=(\Omega, C)$ is transformed to a single-unit RAS with unit capacities. Then, applying the following steps for each resource $R_i \in R$: (a) adding one unit capacity and applying Algorithm 1 to compute the output state space; (b) comparing the computed state space with a well-developed state space tool such as Tina or INA, (i) if the number of elements is not equal to each other, then repeat step (a), (ii) Otherwise, the minimum capacity of the considered resource is equal to its capacity before the latest reconfiguration; finally, the initial resource configuration is computed and at the same time it is the minimal requirement for the correctness of algorithms. For example, the initial resource configuration of the RAS shown in FIG. 4 should be 1, 2, 1 for $C_1$, $C_2$ and $C_3$, respectively. Thus, the constraint is that $C(R_2)$ should be more than two units. The initial resource configuration constraint is deduced when an RAS is single unit; otherwise, the output state space computed by Algorithm 1 cannot correctly compute all the elements for a reconfigured RAS.

An approach to decide the reachability of a given state is provided, i.e., given a state vector $s \in \mathbb{N}^{|\xi|}$, decide whether $s \in S(\Phi)$ for an RAS $\Phi$ with $\xi$ processing stages. If it is reachable, the event sequences which lead to $s \in S$ from the initial state $s_0$ is computed.

Here expands on a method that is efficient to decide whether a given state s is reachable from the initial state $s_0$ in an RAS $(\Omega; C)$ if $S(\Phi^{(0)})=S(\Omega^{(0)}, C^{(0)})$ is given. It is shown that there is a strong relationship between the output state space (under reconfiguration) $S(\Omega, C)$ and $S(\Phi^{(0)})$ obtained by an impulse resource configuration $C^{(0)}$, where the reconfiguration typically represents an incremental of the number of the resources units.

Proposition 3

Let $\Phi^{(0)}=(\Omega^{(0)}, C_0)$ be a D/SU-RAS and $\Phi^{(1)}=(\Omega^{(1)}, C^{(1)})$ be it's a reconfigured version by increasing the capacities of its resources. Given a $\xi$-dimensional vector s, it is reachable in $S(\Phi^{(1)})$ if and only if (iff) there exists at least a vector $s_c \in S(\Phi^{(0)})$ such that $s \in S^{(1)}(s_c)$.

Since there is a $\xi$-dimensional vector $s_c \in S(\Phi^{(0)})$ such that $s \models s_c$, by Theorem 1, s is reachable in $S(\Phi^{(1)})$. Let $s_c \in S(\Phi^{(0)})$ be a state. By Theorem 1, there is a set of states derived from sc in the reconfigured RAS $\Phi^{(1)}$, which is denoted by $S^{(1)}(s_c)=\{s \in S(\Phi^{(1)}) | s \models s_c\}$. If S is reachable in $\Phi^{(1)}$, then there exists a state $s_c \in S(\Phi^{(0)})$ such that $s \in S^{(1)}(s_c)=\{s \in S(\Phi^{(1)}) | s \models s_c\}$.

FIG. 9 shows a pseudocode 900 for algorithm 3 which is to be formulated to address the problem whether a vector s is reachable or not is formulated. In Algorithm 3, an impulse state space $S(\Phi^{(0)})$ is computed. The resources that have different capacities in $\Phi^{(0)}$ and $\Phi^{(1)}$ are identified. New vectors from the given $\xi$-dimensional vector s are computed by reducing the values of the process instances that request the resource $R\alpha$ and these process instances are related to some routes $\Pi_i \in \Gamma(R_\alpha)$. This can be seen as Theorem 1 is applied in a reverse way since these process instances are increased steadily. Finally, the computed vector s is compared with the elements in the impulse state space. If s equals any of these vectors, then s is reachable in $S(\Phi^{(1)})$.

In an example embodiment, suppose having the RAS $\Phi^{(1)}$ and its configuration is described in Table 1000 shown in FIG. 10. Suppose that s=[0, 2, 0, 1, 1, 1] is the state whose reachability is checked. Let $S(\Phi^{(0)})$ be the impulse state space such that the capacity of $R_2$ is only reduced to 1 which is exactly the state space presented in FIG. 4. If Algorithm 3 is applied to s, then two vectors namely $s^*_1=[0, 1, 0, 1, 0, 1]$ and $s^*_2=[0, 0, 0, 1, 1, 1]$ are derived from s, viz., $S^{(0)}(s)=\{s^*_1, s^*_2 | s^*_1 \models s, s^*_2 \models s\}$. It is easy to check that $s^*_1 \notin S(\Phi^{(0)})$ and $s^*_2 \equiv s^{14} \in S(\Phi^{(0)})$. Thus, s is reachable in $S(\Phi^{(1)})$.

As a method to decide the reachability of a given state s in $S(\Phi^{(1)})$ is defined, now, a method to find an event sequence $\sigma$ that leads to a reachable state s in $S(\Phi^{(1)})$ from the initial state $s_0$, i.e., $s=\hat{f}(s_0, \sigma)$ is shown.

In one example embodiment, let $\Phi=(\Omega, C)$ be a D/SU-RAS and $\Phi^{(1)}=(\Omega^{(1)}, C^{(1)})$ be a reconfigured version. Let $s \in S(\Phi^{(1)})$ and a processing stage $\Xi_p \in \cup_{j=1}^n \mathcal{Q}'$ where $\mathcal{Q}'$ denote the set of source nodes of $\Upsilon_j$ and $\Xi_p$ requests the reconfigured resource $R_\alpha \in R$ ($\alpha \in \mathbb{N}_m$). A vector $s_0$ is defined as follows:

$$\forall l=1, \ldots, \xi, s'[l] = \begin{cases} s[l]-1, & \text{if } l=p \\ s[l], & \text{otherwise} \end{cases}$$

If s' satisfies Eq. (1), then $\exists e_{rp} \in E'$, $\hat{f}(s', e_{rp})=s$.

Let $\Xi_p \equiv D(\Xi_j)[\alpha] \neq 0$ where $R_\alpha$ is the reconfigured resource. By Proposition 2, it is inferred that deallocating one unit from s[p] leads to a state vector s' that exists in both input and output state spaces. In addition, by Theorem 1, it is shown that the reconfiguration is related to the satisfaction of Eq. (1). Since the system is single-unit, then only one unit can be allocated at the element s[p], which is equivalent to a transition function from s' to s by an event $e_{rp} \in E'$, i.e., $\hat{f}(s', e_{rp})=s$.

In another example embodiment, let $\Phi=(\Omega, C)$ be a D/SU-RAS and $\Phi^{(1)}=(\Omega^{(1)}, C^{(1)})$ be a reconfigured version. Let $s \in (\Phi^{(1)})$ and $\Xi_p$ be a successor of $\Xi_r$ in graph $\Upsilon_j$ ($j \in \mathbb{N}_n$). Suppose that $R_\alpha \in R$ ($\alpha \in \mathbb{N}_m$) is the reconfigured resource where $\Xi_r$ requests a unit from $R_\alpha$ to move to the next stage $\Xi_p$. A vector s' is defined as follows:

$$\forall l=1, \ldots, \xi, s'[l] = \begin{cases} s[l]-1, & \text{if } l=p \\ s[l]+1, & \text{if } l=r \\ s[l], & \text{otherwhise} \end{cases}$$

If s' satisfies Eq. (1), then $\exists e \in \overline{E}$, $\hat{f}(s', e_{rp})=s$.

Suppose that $\Xi_p$ is a successor of $\Xi_r$ in graph $\Upsilon_j$ ($j \in \mathbb{N}_n$). Let $\Xi_p \equiv D(\Xi_p)[\alpha] \neq 0$ where $R_\alpha$ is the reconfigured resource. Analogously, deallocating a process instance from s[p] and allocating a new process instance in s[r] leads to a state vector s' that exists in both $S(\Phi)$ and $S(\Phi^{(1)})$. This is also true iff Eq. (1) is satisfied. Since the system is single-unit, $\exists e \in \overline{E}$, $\hat{f}(s', e_{rp})=s$.

In yet another embodiment, let $\Phi = \langle \Omega, C \rangle$ be a D/SU-RAS and $\Phi^{(1)} = \langle \Omega^{(1)}, C^{(1)} \rangle$ be a reconfigured version. Let $s \in S(\Phi^{(1)})$ and a processing stage $\Xi_r \in U_{j=1}^n \mho'$ where $\mho'$ denote the set of sink nodes of $\Upsilon_j$ and $\Xi_r$ requests reconfigured resource $R_\alpha (\alpha \in \mathbb{N}_m)$. A vector s' is defined as follows:

$$\forall l = 1, \ldots, \xi, s'[l] = \begin{cases} s[l] + 1, & \text{if } l = r \\ s[l], & \text{otherwise} \end{cases}$$

If s' satisfies Eq. (1), then $\exists e \in E^\backprime$, $\hat{f}(s', e_{rp}) = s$.

The proof of this is similar except that the considered processing stages are those $\Xi_r \in U_{j=1}^n \mho^\backprime$.

Now the event sequences can be constructed based on the various types of events with respect of Eq. (1). The fact that a system under consideration is single-unit means that an event e moves the system from a state to another by requesting only one resource type at each transition. Thus, it is feasible to compute the previous state by only allocating, deallocating or advancing to the next stage and once the obtained state satisfies Eq. (1), the event is enabled and the state is reachable.

FIG. 6 shows a pseudocode 1200 for algorithm 4 which describes how to construct the reachable subspace starting from a given state s and finishing at the initial state space $s_0$ by iteratively identifying the set of vectors related to the event types: $e \in E'$ (line 1-18), $e \in E^\backprime$ (line 19-31) and $e \in \bar{E}$ (line 32-43) while only the state vectors that satisfy Eq. (1) are accepted.

Figure 13:
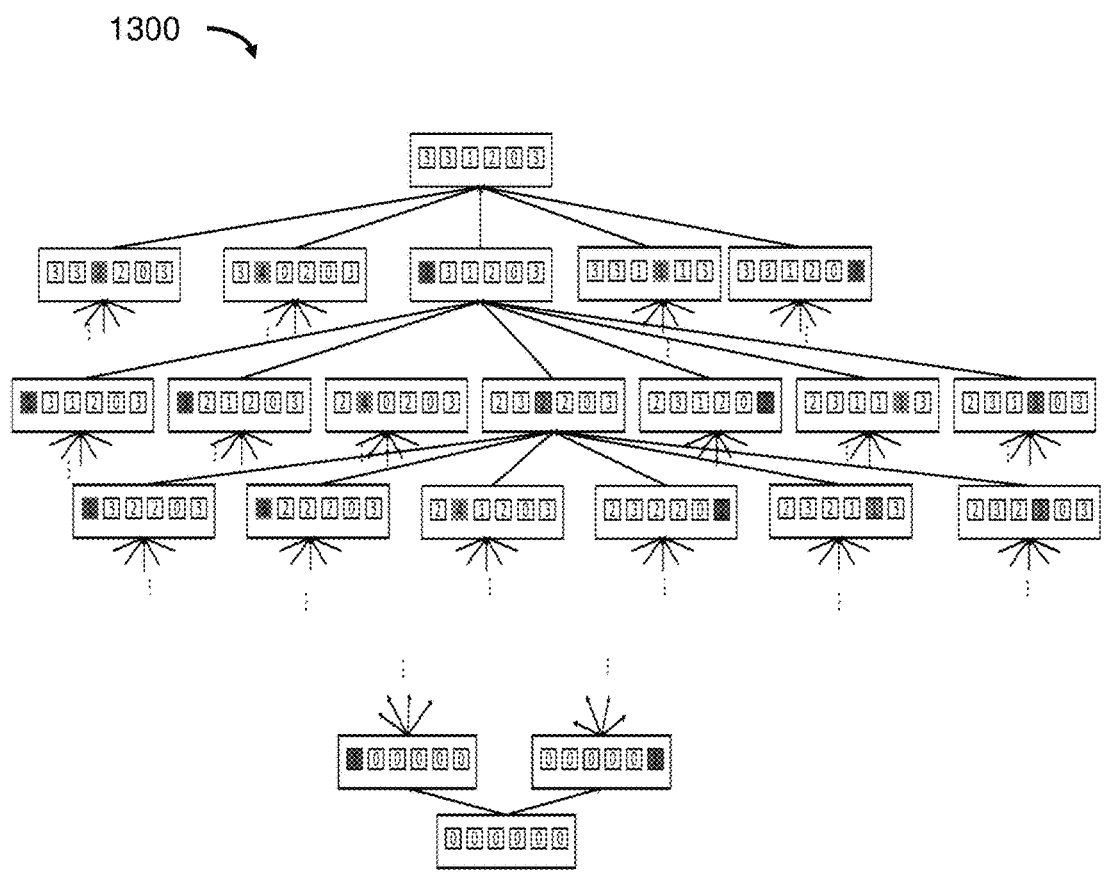
FIG. 13 shows subspace of states that leads to a reachable state vector s=[3,3,1,2,0,3] in accordance with an example embodiment.

In one example embodiment, let $\Phi$ be a D/SU-RAS that its related configuration is shown in Table 1100 in FIG. 11. Suppose having a reachable state vector $s \in S(\Phi)$ with $s = [3, 3, 1, 2, 0, 3]$, algorithm 4 generates, at a first step, the set of states based on the different events as shown in FIG. 8. Let $Q = \{s_1 = [2,3,1,2,0,3], s_2 = [4,2,1,2,0,3], s_3 = [3,3,2,2,0,3], s_4 = [3,3,1,2,0,2], s_5 = [3,3,1,1,1,3], s_6 = [3,3,1,3,0,3], s_7 = [3,4,0,2, 0,3]\}$. However, $s_2$ and $s_6$ do not satisfy Eq. (1). Thus, $s_2$ and $s_6$ are not reachable and should be removed from the set Q. Next, moving to the second level is by finding the state vectors that precede the state vectors in Q. By way of example, FIG. 13 shows a subspace of states that leads to a reachable state vector $s = [3, 3, 1, 2, 0, 3]$, seven state vectors lead to $s_1$, among which three states reach s1 by an event $e \in E^\backprime$, two states reach $s_1$ by an event $e \in E'$ and two states reach $s_1$ by an event $e \in \bar{E}$. When the list Q reaches the initial state and no more vectors are in it, Algorithm 4 terminates and the event sequences to reach a states are obtained.

Thus, the results can be illustrated by defining algebraic expressions for computing a large state space for a considered D/SU-RAS. Let $I_{m,n}(S(\Omega^{(i)}, C^{(i)}))$ denote the input state space which contains m state vectors and n columns where $n = \xi$ by the definition of state vectors. The output matrix $(S(\Omega^{(i+1)}, C^{(i+1)}))$ is constructed by the convolution of the input matrix $I_{m,n}(S(\Omega^{(i)}, C^{(i)}))$ and the impulse resource configuration in one example embodimeny. Since the convolution has been characterized by the an update to the state vectors in the input Matrix $I_{m,n}(S(\Omega^{(i)}, C^{(i)}))$ where an update essentially requires the identification of the processing stages that require the reconfigured resource $R_\alpha$. Let $\Theta = \{p_0, p_1, \ldots, p_k\}(k \in \mathbb{N}_\xi)$ be an index set denoting their corresponding columns. Thus, an update corresponds to the allocation of a resource unit in a particular element in $I_{m,n}(S(\Omega^{(i)}, C^{(i)}))$ as revealed in Theorem 1. For that, a matrix is created, for each $p \in \Theta$, that is called an update matrix $M_{m,n}(p)$ which is a zero matrix in all of its columns except the column p in which every element equals to 1, i.e., it can be defined as follows:

$$M_{m,n}(p)_{p \in \Theta} = (a_{i,j})_{1 \leq i \leq m, 1 \leq j \leq n} = \begin{cases} 1 & \text{if } j \equiv \Xi_p \\ 0 & \text{otherwhise} \end{cases}$$

For example, in FIG. 2, let $R_\alpha = R_2$. Then, the process instances $\Xi_{1,2}$ and $\Xi_{2,2}$ are considered and, consequently, we have $\Theta = \{2, 5\}$. Let the (output matrix($S(\Omega^{(i+1)}, C^{(i+1)})$)) be represented as follows:

$$(S(\Omega^{(i+1)}, C^{(i+1)})) = \begin{bmatrix} f(M_{m,n}(p_0)) \\ f(M_{m,n}(p_1)) \\ \vdots \\ f(M_{m,n}(p_k)) \end{bmatrix} \quad \text{Eq. (17)}$$

where, $\Theta = \{p_0, p_1, \ldots, p_k\}$ is computed by:

$$\forall p_i \in \Theta, f(M_{m,n}(p_i)) = I_{m,n}(S(\Omega, C^{(i)})) + M_{m,n}(p_i) \quad \text{Eq. (18)}$$

Eq. (18) computes a partial impulse state space, $f(M_{m,n}(p_i))$ by enabling the process instances at the column p for all the state vectors of $I_{m,n}(S(\Omega, C^{(i)}))$. Finally, as shown in Eq. (17) the impulse state space sums up all the partial state spaces to construct the complete representation of the state space that takes the system from an impulse resource configuration $C^{(i)}$ to $C^{(i+1)}$.

In one example embodiment, to compute the state space of the RAS $\Phi = \langle \Omega, C \rangle$ described in Table 1400 in FIG. 14, the input state space $S(\Omega^{(0)}, C^{(0)})$ has 2740 state vectors, the matrix $I_{2740,14}(S(\Omega, C^{(0)}))$ is obtained. Let the configured resource be $R_1$, and then $\Xi_{1,2}$ and $\Xi_{2,1}$ are considered with $\Theta = \{1, 9\}$. Two matrices $M_{2740,14}(1)$ and $M_{2740,14}(9)$ are created and the partial state matrices $f(M_{2740,14}(1))$ and $f(M_{2740,14}(9))$ are computed, where $f(M_{2740,14}(1)) = I_{2740,14}(S(\Omega, C^{(0)})) + f(M_{2740,14}(1))$ and $f(M_{2740,14}(9)) = I_{2740,14}(S(\Omega, C^{(0)})) + f(M_{2740,14}(9))$ Finally, $S(\Omega^{(1)}, C^{(1)})$ is computed which is the output state space with $$S(\Omega^{(1)}, C^{(1)}) = \begin{bmatrix} f(M_{2740,14}(1)) \\ f(M_{2740,14}(9)) \end{bmatrix}$$

The experiment study provides the comparison of different examples of D/SU-RASs for the generation of large state spaces using the defined algorithms. Tina is used to decide the impulse resource configuration for an RAS. The foregoing algorithms are implemented in Python.

In one example embodiment, the considered D/SU-RAS has three resource types $R_1$, $R_2$, $R_3$ with $C(R_1) = 10$ and $C(R_2) = C(R_2) = 6$, and two process types that are defined in FIG. 2. FIG. 15 shows Table 1500 which compare the reachability graphs and reveals a representative sample of the results obtained in the experiments, with the first column reporting the number of the required configurations to obtain the target structure, the second column indicating the corresponding resource that is related to the new configuration and the third column showing the new capacity of each resource, the fourth column indicating the obtained number of states according to one example embodiment.

First, the RAS is to be unit-capacitated with $C(R_1) = C(R_2) = C(R_3) = 1$. This resource configuration cannot be used to generate the impulse state space, since the application of Algorithm 1 does not lead to a correct expanded state space, as shown by a well-developed Petri net analysis tool TINA. As stated previously, choosing $C(R_1)=C(R_3)=1$ and $C(R_2)=2$ as the initial RAS from which its state space is computed as the impulse state space and furthermore, use it for the state space computation of the target RAS. Configurations 2-20 performs the operation of increasing the number of units of resources.

Moving from a resource configuration to another requires the application of Algorithm 1 since adding a single unit to a specific resource. In conclusion, an example embodiment has succeeded to compute the large state space starting from a small state space of an initial RAS. In the following, complex RAS s with more process plans and resources are considered.

To compute the state space of an RAS that is described in Table 1600 in FIG. 16, the computational results shown in Table 1800 in FIG. 18 reveals that an example embodiment has succeed to compute the whole state space through the application of the example embodiment. The results of each iteration which corresponds to incrementing the number of units in a resource are captured. For this example, the final state space has 30912024 elements.

Table 1700 in FIG. 17 shows state space computation of various RASs in example embodiments. FIG. 19 shows Table 1900 for RAS (a) has four process types with seven resources. One can obtain 37287990 reachable states as shown in the last configuration of Table 2000 in FIG. 20. FIG. 21 shows table 2100 for RASs (b), the target state space has 45533100 as shown in the last configuration of Table 2200 in FIG. 22. FIG. 23 shows table 2300 for RASs (c), the target state space has 2189916 elements as shown in the last configuration of Table 2400 in FIG. 24.

Based on the computed impulse state space, the target state space is obtained step by step in an iterative way in an example embodiment. At a step i, the computation of $S(\Phi^{(i)})$ is based on the previous state space $S(\Phi^{(i+1)})$ obtained at step i−1. At each step, only a resource type $R_\alpha$ whose resource capacity is increased by one is considered, which involves algebraic operations on a limited elements of a state space s $2\ S(\Phi^{(i-1)})$. That is to say, the local modification or update of a previously computed state space leads to the efficiency of example embodiments by using algebraic additions or subtractions only.

Experimental results demonstrate the efficiency of methods and systems in example embodiments. The results is a significant impetus to the field of supervisory control of discrete event systems by breaking the intractability of a large state space representation of a real-world RAS.

The relation between state spaces is based on the structural representation of the RAS which are: (i) the resource that requires more units to construct the target RAS and (ii) the identification of the process types which request this resource. Numerical results confirm the correctness of the method and system of example embodiments, thereby the maximally permissive LES is further strengthened, the computation overheads of the state space is mitigated. It is revealed that the state space of a D/SURAS can be computed through the application of Algorithm 1 to a small subspaces until the construction of the large state space by applying Algorithm 2. The computational cost is alleviated by omitting or disabling some states such that these states that are related to process plans whose paths define an opposite path for other process plans, can be computed separately. An immediate advantage is the knowledge of the states that emanate from a marked state which becomes an easy task by applying Algorithm 1 to generate the subsequent states. In addition, it becomes possible to check the reachability of a given state without computing the whole state space which is supposed to be large. Example embodiments provide a method which computes the event sequences that lead to such a reachable state.

Figure 25:
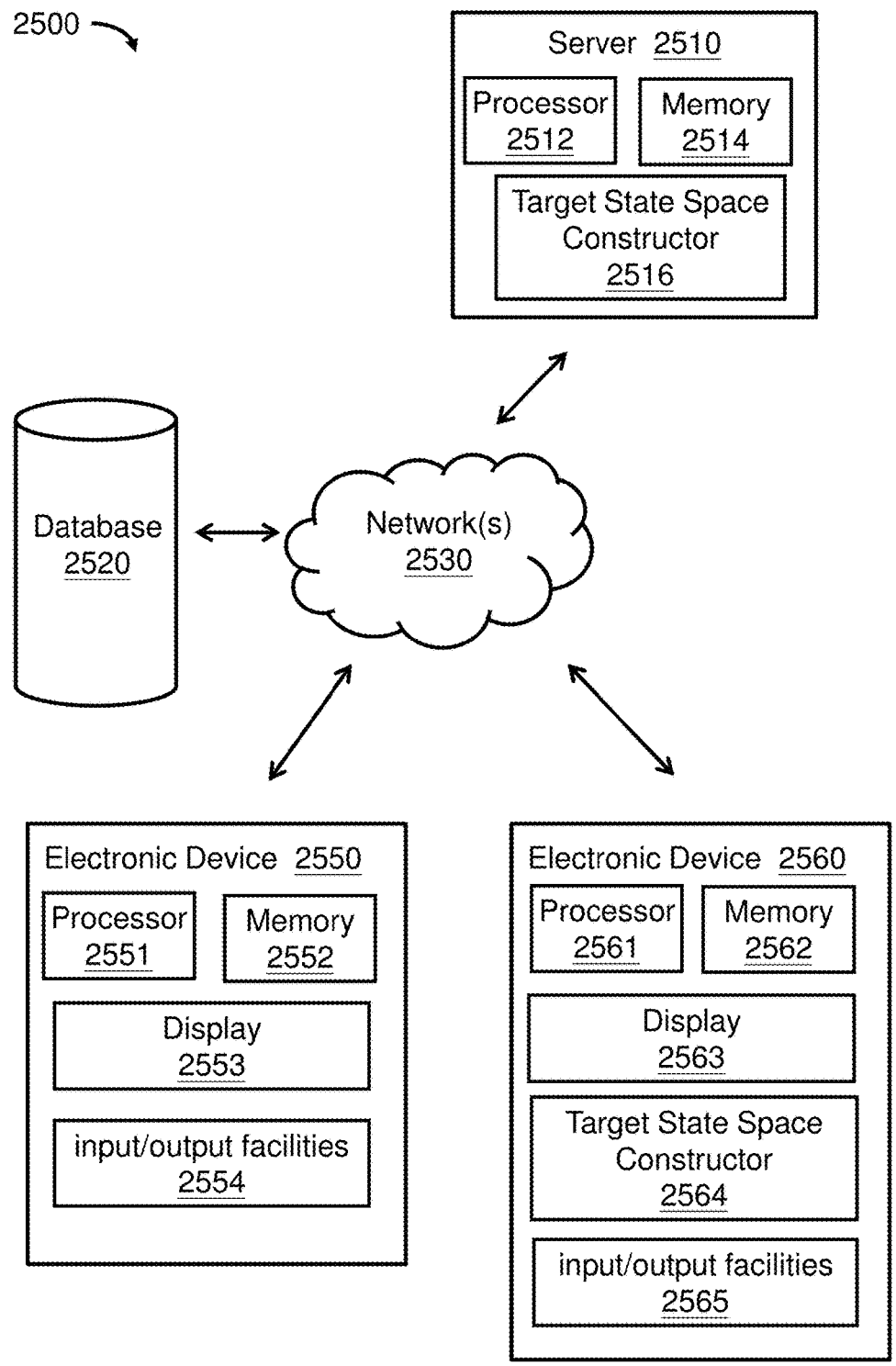
FIG. 25 shows a computer system reduces CPU time to process instructions that construct a state space of a RAS in accordance with an example embodiment.

FIG. 25 shows a computer system 2500 that executes and constructs a target state space of a RAS in one example embodiment. The computer system includes one or more of a server 2510, a database 2520, and one or more of an electronic device 2550 or 2560 in communication via one or more networks 2530.

The server 2510 includes a processor or processing unit 2512, a memory 2514, and a target state space constructor 2516.

The electronic device 2550 includes one or more of a processor or processing unit 2551, memory 2552, display 2553 and input/output facilities 2554. The electronic device 2560 includes one or more of a processor or processing unit 2561, memory 2562, display 2563, target state space constructor 2564 and input/output facilities 2565. Examples of an electronic device include, but are not limited to, laptop computers, desktop computers, tablet computers, handheld portable electronic devices (HPEDs), and other portable and non-portable electronic devices.

The database 2340 includes electronic storage or memory and can store data or other information to assist in executing example embodiments.

The network(s) 2530 can include one or more of a wired network or wireless network, such as the internet, cellular network, etc.

The processor, memory, and/or target state space constructor in the server 2510 and/or electronic device 2560 execute methods in accordance with example embodiments. The target state space constructor can include software and/or specialized hardware to execute example embodiments.

The processor unit includes a processor (such as a central processing unit, CPU, microprocessor, microcontrollers, field programmable gate array (FPGA), application-specific integrated circuit (ASIC), etc.) for controlling the overall operation of memory (such as random access memory (RAM) for temporary data storage, read only memory (ROM) for permanent data storage, and firmware). The processing unit and TB model map constructor communicate with each other and memory and perform operations and tasks that implement one or more blocks of the flow diagrams discussed herein. The memory, for example, stores applications, data, programs, algorithms (including software to implement or assist in implementing example embodiments) and other data.

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

As used herein, "central processing unit time" or "CPU time" is an amount of time for a processor to execute instructions of a computer program.

As used herein, "NP" denotes non-deterministic polynomial-time problem and "NP-hard" are the decision problems in which the problems may not be decidable and do not have to be elements of NP.

What is claimed is:

1. A method executed by a computer system that reduces central processing unit (CPU) time to process instructions that compute a state space of a sequential resource allocation system (RAS) $\Phi$ that allocates a set of resources to multiple processes, the method comprising:
    constructing, by the computer system, an initial RAS $\Phi^{(0)}$ by imposing a predefined initial resource configuration $C_0$ to each system resource type $R_i \in R$, wherein R is a set of system resource types;
    computing, by the computer system, an initial state space $S(\Phi^{(0)})$ of the initial RAS $\Phi^{(0)}$;
    reducing CPU time to process instructions that compute a target state space $S(\Phi)$ of the RAS by:
        extending the initial state space $S(\Phi^{(0)})$ iteratively under a target resource configuration C, wherein each iteration creates a subspace and includes:
            from a resource configuration $C^{(i)}$ of step i, imposing an impulse resource configuration $C^{(i+1)}$ in which a capacity of a resource is increased by one unit; and
            calculating a convolution of an input signal with an impulse response in a linear time invariant system (LTS) that outputs a larger state space, wherein the resource configuration corresponds to the input signal, the impulse resource configuration corresponds to the impulse response.

2. The method of claim 1, wherein the RAS has proprieties of having a number of alternative processes for a sequential logic; and requiring a single unit for all resource requests.

3. The method of claim 1 further comprising:
    reducing, by the computer system, CPU time to process instructions that differentiate predefined desirable and undesirable proprieties by implementing a compact supervisory control in a logical level of the RAS.

4. The method of claim 1 further comprising:
    reducing, by the computer system, CPU time to process instructions that compute event sequences that leads to a reachable state space of the RAS without computing an entirety of the state space of the RAS.

5. The method of claim 1 further comprising:
    reducing, by the computer system, CPU time to process instructions that compute a previous state space by allocating, deallocating or advancing to a next stage.

6. The method of claim 1 is operated over a computer network comprising a plurality of computers.

7. The method of claim 1, wherein the predefined initial resource configuration $C_0$ is determined by identifying a minimal resource configuration required by the computation.

8. The method of claim 7, wherein the minimal resource configuration is determined by:
    transforming a given single-unit RAS with nonunit capacities to a single-unit RAS with unit capacities;
    performing iteration steps, wherein the iteration steps comprise:
        adding one unit capacity for each resource $R_i \in R$;
        computing a output state space; and
        comparing the output state space with a pre-constructed abstract state space.

9. A computer system that reduces central processing unit (CPU) time to process instructions that construct a state space of a disjunctive/single-unit sequential resource allocation system (D/SURAS) $\Phi$ that allocates a set of resources to various processes for exclusive access, the computer system comprising:
    a processor;
    a non-transitory computer-readable medium having stored therein instructions that when executed cause the processor to:
        construct an initial D/SURAS $\Phi^{(0)}$ by imposing a predefined initial resource configuration $C_0$ to each system resource type $R_i \in R$, wherein R is a set of system resource types;
        compute an initial state space $S(\Phi^{(0)})$ of the initial D/SURAS $\Phi^{(0)}$;
        reduce CPU time to process instructions that compute a target state space $S(\Phi)$ by extending the initial state space $S(\Phi^{(0)})$ iteratively under a target resource configuration C, wherein each iteration creates a subspace and includes:
            from a resource configuration $C^{(i)}$ of step i, imposing an impulse resource configuration $C^{(i+1)}$ in which a capacity of a given resource is increased by one unit; and
            calculating a convolution of an input signal with an impulse response in a linear time invariant system (LTS) that outputs a larger state space, wherein the resource configuration corresponds to the input signal, the impulse resource configuration corresponds to the impulse response.

10. The computer system of claim 9 further comprising:
    a compact supervisory control in a logical level of the D/SURAS that improves differentiation of predefined desirable and undesirable proprieties.

11. The computer system of claim 9, wherein the instructions when executed further cause the processor to compute event sequences that leads to a reachable state space of the D/SURAS without computing an entirety of the state space of the D/SURAS.

12. The computer system of claim 9 is operated over a computer network comprising a plurality of computers.

13. The computer system of claim 9, wherein the predefined initial resource configuration $C_0$ is determined by identifying a minimal resource configuration required by the computation.

14. The computer system of claim 13, wherein the minimal resource configuration is determined by:
- transforming a given single-unit D/SURAS with nonunit capacities to a single-unit D/SURAS with unit capacities;
- performing iteration steps, wherein the iteration steps comprise:
  - adding one unit capacity for each resource $R_i \in R$;
  - computing a output state space; and
  - comparing the output state space with a pre-constructed abstract state space.

15. A method that reduces central processing unit (CPU) time to process instructions that compute a state space of a disjunctive/single-unit sequential resource allocation system (D/SURAS) $\Phi$ operating over a computer network comprising a plurality of computers to allocate a set of resources to various processes, the method comprising:
- constructing, by the computer system, an initial D/SURAS $\Phi^{(0)}$ by imposing a predefined initial resource configuration $C_0$ to each system resource type $R_i \in R$, wherein R is a set of system resource types;
- computing, by the computer system, an initial state space $S(\Phi^{(0)})$ of the initial D/SURAS $\Phi^{(0)}$;
- reducing CPU time to process instructions that compute a target state space $S(\Phi)$ by extending the initial state space $S(\Phi^{(0)})$ iteratively under a target resource configuration C, wherein each iteration creates a subspace and includes:
  - from a resource configuration $C^{(i)}$ of step i, imposing an impulse resource configuration $C^{(i+1)}$ in which a capacity of a given resource is increased by one unit; and
  - computing a convolution of an input signal with an impulse response in a linear time invariant system (LTS) that outputs a larger state space, wherein the resource configuration corresponds to the input signal, the impulse resource configuration corresponds to the impulse response.

16. The method of claim 15 further comprising:
reducing, by the computer system, CPU time to process instructions that differentiate predefined desirable and undesirable proprieties by implementing a compact supervisory control in a logical level of the D/SURAS.

17. The method of claim 15 further comprising:
reducing, by the computer system, CPU time to process instructions that compute event sequences that leads to a reachable state space of the D/SURAS without computing an entirety of the state space of the D/SURAS.

18. The method of claim 15, wherein each computer in the computer network includes a processor, a memory and input/output facilities.

19. The method of claim 15, wherein the predefined initial resource configuration $C_0$ is determined by identifying a minimal resource configuration required by the computation.

20. The method of claim 19, wherein the minimal resource configuration is determined by:
- transforming a given single-unit D/SURAS with nonunit capacities to a single-unit D/SURAS with unit capacities;
- performing iteration steps, the iteration steps comprises:
  - adding one unit capacity for each resource $R_i \in R$;
  - computing a output state space;
  - comparing the output state space with a pre-constructed abstract state space.

* * * * *